US012786244B2

(12) United States Patent
Bessega et al.

(10) Patent No.: US 12,786,244 B2
(45) Date of Patent: Nov. 3, 2026

(54) AI-DRIVEN MULTI-AGENT SYSTEM FOR COMPREHENSIVE NETWORK, SECURITY AND ENTERPRISE IT OPERATIONS

(71) Applicant: Extreme Networks, Inc., San Jose, CA (US)

(72) Inventors: Maria Carolina Bessega, Saint-Lambert (CA); Markus Nispel, Wiesbaden (DE); Rosalia Stephany Brassesco, Montreal (CA); Sima Soltani, Waterloo (CA); Jaime Rafael Camacaro, Saint-Lambert (CA); Brendan Fee, Dover, NH (US)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 19/005,501

(22) Filed: Dec. 30, 2024

(65) Prior Publication Data

US 2026/0095489 A1 Apr. 2, 2026

Related U.S. Application Data

(60) Provisional application No. 63/701,480, filed on Sep. 30, 2024.

(51) Int. Cl.

*G06F 15/16* (2006.01)
*G06F 9/451* (2018.01)

(Continued)

(52) U.S. Cl.

CPC .............. *H04L 63/20* (2013.01); *G06F 9/453* (2018.02); *G06F 9/54* (2013.01);

(Continued)

(58) Field of Classification Search

CPC ....... H04L 63/20; H04L 41/16; G06F 16/334; G06F 40/40; G06F 16/33295; G06F 9/54; G06F 9/453; G06N 3/12

See application file for complete search history.

(56) References Cited

U.S. PATENT DOCUMENTS 11,138,518 B1 10/2021 Yu et al.
2012/0023200 A1 1/2012 Johnson et al.

(Continued)

FOREIGN PATENT DOCUMENTS

CN 118113492 A 5/2024
CN 118551751 A 8/2024

(Continued)

OTHER PUBLICATIONS

International Search Report and Written Opinion of the International Searching Authority directed to International Patent Application No. PCT/US2025/048737, mailed Mar. 19, 2026; 8 pages.

(Continued)

*Primary Examiner* — Normin Abedin
(74) *Attorney, Agent, or Firm* — Sterne, Kessler, Goldstein & Fox P.L.L.C.

(57) ABSTRACT

Disclosed herein are system, apparatus, article of manufacture, method and/or computer program product aspects, and/or combinations and sub-combinations thereof, for generating a workflow plan for completing a process. An example embodiment operates by receiving a user request from a user device in which the user request includes a natural language description of the workflow plan. The embodiment then retrieves, from a knowledge database, workflow information associated with a step of the workflow plan. The embodiment then generates a plurality of steps associated with the workflow plan. The embodiment then retrieves plan information from a storage database in which the plan information includes a sample workflow plan (Continued)

generated from a sample user request and the workflow information in which the workflow information is further associated with a step of the sample workflow plan. The embodiment then generates the workflow plan using a large language model (LLM) and a prompt.

20 Claims, 16 Drawing Sheets

(51) Int. Cl.

| | |
|---|---|
| ***G06F 9/54*** | (2006.01) |
| ***G06F 16/3329*** | (2025.01) |
| ***G06F 16/334*** | (2025.01) |
| ***G06F 40/40*** | (2020.01) |
| ***G06N 3/12*** | (2023.01) |
| ***H04L 9/40*** | (2022.01) |
| ***H04L 41/16*** | (2022.01) |

(52) U.S. Cl.
CPC ...... *G06F 16/33295* (2025.01); *G06F 16/334* (2019.01); *G06F 40/40* (2020.01); *G06N 3/12* (2013.01); *H04L 41/16* (2013.01)

(56) References Cited

U.S. PATENT DOCUMENTS

| | | | | |
|---|---|---|---|---|
| 2022/0036424 | A1 | 2/2022 | Almeida et al. | |
| 2022/0283197 | A1* | 9/2022 | Schoenmakers | G01N 35/00871 |
| 2025/0028759 | A1 | 1/2025 | Castillo et al. | |
| 2025/0139447 | A1* | 5/2025 | Agarwal | G06F 9/4843 |
| 2025/0190230 | A1 | 6/2025 | Inala et al. | |
| 2025/0259008 | A1 | 8/2025 | Wen et al. | |
| 2025/0342182 | A1 | 11/2025 | Nabel | |
| 2025/0348360 | A1* | 11/2025 | Abadi | G06F 9/5027 |
| 2025/0355645 | A1 | 11/2025 | Crabtree et al. | |
| 2025/0368219 | A1 | 12/2025 | Thompson, III | |
| 2026/0012431 | A1 | 1/2026 | Bhat et al. | |
| 2026/0019380 | A1 | 1/2026 | Bhat et al. | |
| 2026/0080176 | A1* | 3/2026 | Padmanabhan | G06F 40/30 |
| 2026/0087303 | A1 | 3/2026 | Ravi et al. | |
| 2026/0093508 | A1 | 4/2026 | Bessega et al. | |
| 2026/0093727 | A1 | 4/2026 | Bessega et al. | |
| 2026/0095488 | A1 | 4/2026 | Bessega et al. | |

FOREIGN PATENT DOCUMENTS

| | | | |
|---|---|---|---|
| CN | 118626690 | A | 9/2024 |
| CN | 118709716 | A | 9/2024 |

OTHER PUBLICATIONS

Zhao et al., "LongAgent: Scaling Language Models to 128k Context through Multi-Agent Collaboration," arXiv, Mar. 13, 2024; 19 pages.

* cited by examiner

AI-DRIVEN MULTI-AGENT SYSTEM FOR COMPREHENSIVE NETWORK, SECURITY AND ENTERPRISE IT OPERATIONS

CROSS-REFERENCE TO RELATED APPLICATIONS

This application claims priority to U.S. Provisional Patent Application No. 63/701,480, filed on Sep. 30, 2024, the contents of which are incorporated herein by reference in its entirety.

BACKGROUND

Enterprise platforms collect, transform and store data from any connected devices, clients, users and applications. This data can be used to provide insights for decision making and to automate any type of tasks as well as to provide new experiences to customers as it combine information technology (IT) infrastructure and other business data. Until now solid operations and data collection and storage have prevented efficient operations and limited the ability to create meaningful options for network management, security, and IT operations.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
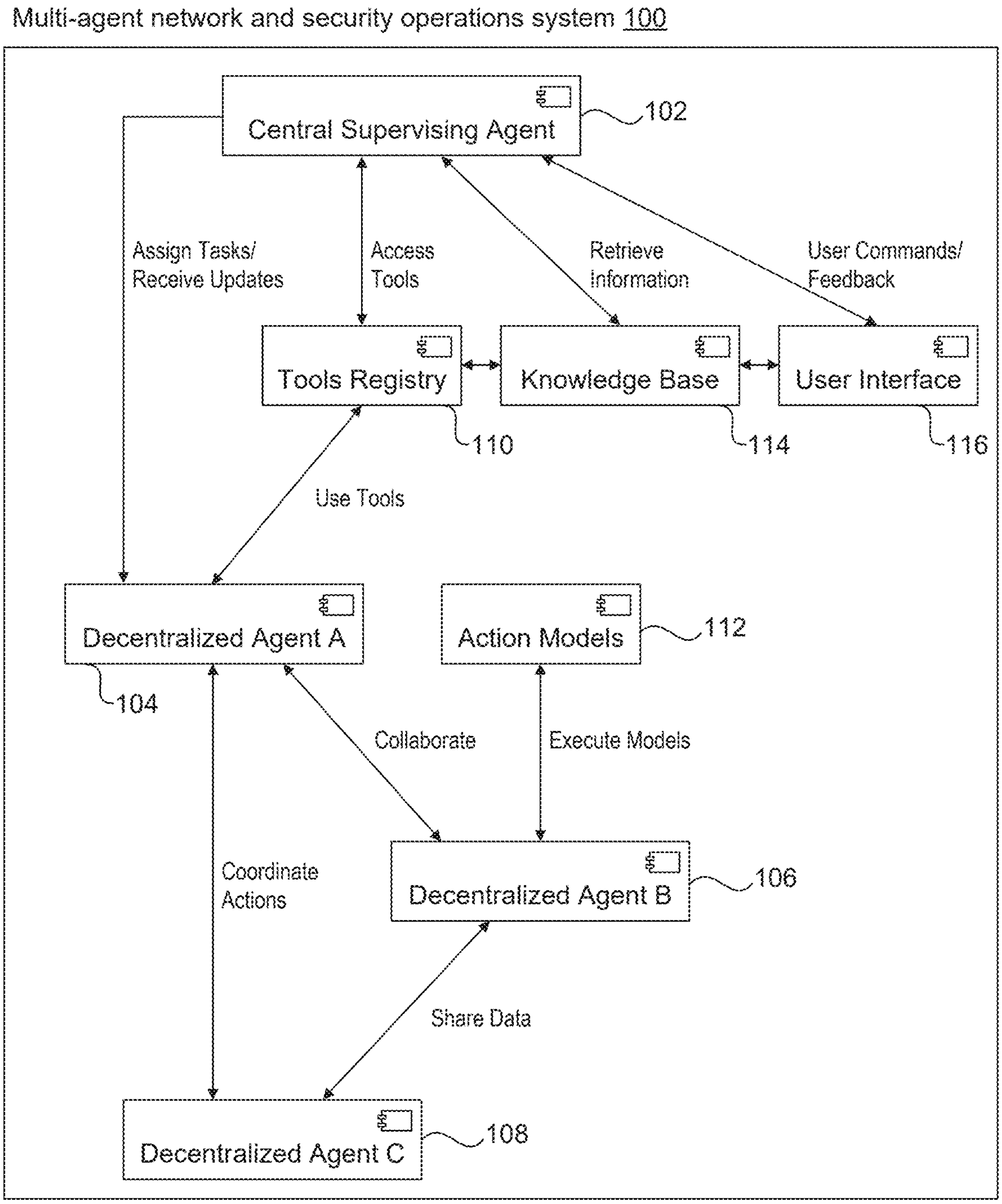
FIG. 1 is a block diagram of a multi-agent network and security operations system, according to aspects of the present disclosure.

Provided herein are system, apparatus, device, method and/or computer program product aspects, and/or combinations and sub-combinations thereof, for comprehensive network management. This disclosure is generally directed to a multi-agent network and security operations system, and more particularly an artificial intelligence (AI)-driven multi-agent network and security operations system to create autonomous, efficient, and adaptive solutions capable of performing complex tasks across the entire network spectrum with minimal human intervention.

Embodiments described herein represent a compound AI (e.g., computer systems able to perform tasks that typically require human intelligence) platform utilizing at least one of a network of specialized Generative Artificial Intelligence (GenAI) (e.g., AI models that generate new data resembling training data) agents, reinforcement learning (RL) agents for optimization, or an agent that may use another machine learning model. Such a group of agents may collaborate to autonomously manage various aspects of network operations, including design, deployment, configuration optimization, anomaly detection, real-time remediation, security policy management, and/or user behavior analysis.

Network and security operations systems may suffer from various technological problems and challenges associated with managing network activities due to at least one of the complexity of modern networks, importance of network-based communications, reactive approaches, evolving security threats, and/or limited automation. Specifically, the increasing size and complexity of modern networks often makes manual management inefficient and error-prone. As organizations and individuals rely more heavily on network-based communications for critical operations, including but not limited to, cloud computing, remote collaboration, Internet of Things (IoT) devices, and real-time data exchange. This dependence amplifies the impact of network issues in network-based communications, such as downtime, latency, or security, making reliability and performance more crucial than ever. Managing the quality of service (QoS), ensuring high availability, and/or scaling to meet growing demands present significant challenges that network and security operations systems struggle to address effectively. Network and security operations system often react to issues after they occur rather than preventing them proactively. Static security policies are often insufficient against sophisticated and evolving cyber threats. Network management tools often lack the intelligence to adapt to dynamic network environments without significant human intervention Furthermore, network and security operations systems may be rule-based automation systems in which the systems may use predefined rules but cannot handle unforeseen scenarios or adapt to changes. Network and security operations systems may only support single-task AI systems in which the system focuses on specific tasks but lack collaborative capabilities for comprehensive management. Network and security operations systems that use network management platforms may offer monitoring and basic automation but require manual input for complex operations. Such network and security operations systems often suffer from inadequate scope without autonomously covering a full spectrum of network management tasks. These network and security operations systems also suffer from a lack of adaptability in which static configurations and policies fail to adjust to real-time network conditions. In addition, network and security operations systems may suffer from high operational costs in which significant human resources are required for planning, optimization, and security enforcement.

To tackle these challenges, the integration of one or more GenAI agents, one or more RL agents, or an agent that may use any other machine learning models, compound AI architectures, and interactive workflows offers a transformative approach—enabling systems to autonomously plan, execute, and optimize workflows across all facets of network management. GenAI agents may have and use registered tools including the machine learning models by themselves or delegate tasks to other agents that can execute pure machine learning tasks. Other AI techniques like optimization techniques like genetic algorithms for optimization or other causality techniques like counterfactuals of causal structure discovery can also be accepted as agent tools. Innovative AI-driven technologies designed to revolutionize network management by covering all aspects beyond daily operations autonomously handle planning, design, deployment, security, operations, and optimization, enhancing efficiency, reliability, scalability, and security in network operations. In addition, building upon GenAI Agents and at least a large language model (LLM) and/or other embedded representation models, embodiments described herein support multimodality to improve the understanding of networking's complex state space. By leveraging this information, embodiments effectively interpret and communicate network events to users, facilitating clearer comprehension of intricate states in network management.

In particular, embodiments herein support holistic autonomy in autonomously managing the entire network lifecycle, including planning, optimization, and/or security enforcement. Embodiments herein also support dynamic agent collaboration by employing adaptive agent roles and real-time collaboration. For example, embodiments herein coordinate multiple autonomous agents in real-time and adapt to changing network conditions dynamically. In addition, the embodiments herein support natural language integration to combines natural language understanding (NLU) with technical workflows for seamless user interaction. In summary, the embodiments herein uniquely combine these elements to operate beyond the capabilities of existing technologies, offering an unprecedented level of autonomy, adaptability, and user interaction in network management.

System Architecture and Capabilities

Embodiments described herein solve these technological challenges through a flexible, collaborative multi-agent architecture in which an agent of this architecture may have an objective function that encapsulates one or more agents' goals and/or functions. For example, some of the agents may use a LLM to define their functions. Some of the agents may use any RL or genetic algorithms to define their functions. A GenAI agent may also use other models (e.g. not LLM) or algorithms to measure its goal, such as some form of analytical LLM agent. Furthermore, the flexible, collaborative multi-agent architecture may also have a capability to select at least among centralized and decentralized agent system architectures and their hybrid approach. The flexible selection between these system architectures may be dynamically determined based on the complexity and/or nature of the tasks at hand. The collaboration between agents can allow, as a tool, one agent to decide to call one or more agents. The collaboration may also support one agent to delegate tasks to other agents. By dynamically selecting the most appropriate architectural approach and collaborating between different agents, the multi-agent network and security operations system may optimize performance, efficiency, and adaptability, ensuring effective management across diverse network environments and challenges. In addition, the system may include explainability (e.g., explainable AI) of AI applications (e.g., using multimodality)—a set of processes and methods that may allow users to comprehend and trust the results and outputs created by the multi-agent network and security operations system with AI and ML models embedded. The explainability of AI applications may serve to future-proof of the system, as explainable AI will continue to grow as a trend for users of AI applications.

The centralized architecture may include, but is not limited to, a supervising agent coordination and an efficient resource allocation. In supervising agent coordination, for tasks that require tight coordination, consistency, and centralized oversight, a supervising agent may orchestrate the activities of specialized agents—this approach may simplify management and may be efficient for tasks with lower complexity or when a unified control point is advantageous. Centralized control, with an embedded efficient resource allocation, may also allow for optimal allocation of resources and reduces redundancy in agent activities. The decentralized architecture may include, but is not limited, to an autonomous agent collaboration and an enhanced scalability and robustness. In autonomous agent collaboration, for more complex, distributed, or large-scale tasks, agents may operate in a decentralized manner—they may collaborate directly with each other without a central controller, sharing information and coordinating actions as peers. Decentralization, with the enhanced scalability and robustness, may improve scalability by allowing the system to handle increased loads without bottlenecks. It may also enhances fault tolerance, as the system does not need to rely on a single point of control when any agent failures may occur. The hybrid approach may include, but is not limited to, an adaptive architecture selection and a task-specific configuration. In architecture selection, the multi-agent network and security operations system can adopt a hybrid model, combining centralized and decentralized architectures as needed. For example, a central agent may oversee high-level objectives while decentralized agents may handle specific sub-tasks autonomously. Architectural choices, with task-specific configuration, may be made based on real-time assessments of task requirements, complexity, and network conditions.

In addition, agent collaboration may exist at the same level within architectures, as it can dynamically generate connections. This may add an extra dimension to centralized, decentralized, and hybrid architectures, making them more adaptable, flexible, and collaborative. These connections may be driven by the decision-making capabilities of LLMs, which can assess real-time conditions and optimize communication pathways or processes based on contextual data. By leveraging the multimodal learning abilities, agent collaboration may not only facilitate seamless interaction between different components but can also enhance the architecture's capacity to adapt to changes, scale efficiently, and respond to complex networking events. This dynamic approach to architecture design may offer a significant advantage in environments where static, predefined connections may not be sufficient to handle the evolving complexity of modern networks.

Key features of this flexible, collaborative multi-agent architecture of the multi-agent network and security operations system may include, but are not limited to, comprehensive network management, adaptive multi-agent collaboration, explainable AI capability, tools registry and action models, adaptive operation modes, intelligent task assignment, scalability and fault tolerance, and security and compliance.

In particular, the multi-agent network and security operations system, with comprehensive network management, may extend its capabilities beyond daily operations to include planning, design, deployment, security enforcement, optimization, and user behavior management, covering the entire network lifecycle. The adaptive multi-agent collaboration may enable specialized agents of the multi-agent network and security operations system to collaborate either under centralized supervision or in a decentralized framework depending on the task's demands, providing a dynamic agent interaction. The adaptive multi-agent collaboration may also enhance the system's ability to efficiently address complex network tasks and adapt to changing conditions. The tools registry and action models may ensure that the agents have access to a broad range of tools, including but not limited to content repositories, structured query language (SQL), NoSQL and Graph databases application programming interfaces (APIs), vector stores, search engines, real-time data streams, optimization mechanisms like reinforcement learning or genetic algorithms, causality techniques, and/or pre-defined machine learning models. The tools registry may also enable seamless integration of new tools and resources, allowing the multi-agent network and security operations system to evolve with technological advancements. Also, multimodality can be leveraged to improve the tools registry and action models by expanding the understanding of the networking state space. The adaptive operation modes may enable agents to provide immediate responses and solutions to real-time network queries and issues. The adaptive operation modes may also ensure users can schedule tasks to be performed at specific times or intervals, automating routine network management activities. The adaptive operation modes may enable agents to operate in the background, continuously monitoring network conditions and proactively notifying users of relevant changes or events. The intelligent task assignment may enable the multi-agent network and security operations system to evaluate the complexity and nature of each task to determine the optimal architectural approach (e.g., centralized or decentralized). The intelligent task assignment may also allocate computational and network resources efficiently based on task requirements. The security and compliance may implement secure communication protocols between agents, whether operating centrally or de-centrally. The security and compliance may also ensure that the operations comply with relevant industry standards and regulations.

With the key features of this flexible, collaborative multi-agent architecture, the multi-agent network and security operations system may provide significant technical advantages in network management. The system benefits may include, but not limited to, comprehensive management, explainable AI capability, enhanced efficiency, scalability, user-friendly interaction, and/or improved security and compliance.

The comprehensive management of the multi-agent network and security operations system may offer at least end-to-end capabilities, covering planning, deployment, optimization, and/or security. The multi-agent network and security operations system may automate complex and repetitive tasks, reducing manual intervention and improving response times. By automating complex and repetitive tasks, the multi-agent network and security operations system may gain efficiency—significantly reducing the need for manual intervention, lowering operational costs and improving overall network performance. The multi-agent network and security operations system may be designed to scale by easily integrating additional tools and agents, adapting to various network scenarios—the scalability may adapt seamlessly to growing or changing network environments, ensuring robust and scalable network management. The multi-agent network and security operations system may provide features intuitive interfaces and conversational interactions, making it accessible to both technical and non-technical users. For example, the system, with at least three operation modes including conversational features, may, on demand, react to user generated or predefined prompts. In some aspects, the multi-agent network and security operations system may utilize natural language interfaces, making complex network management tasks more approachable and easier to execute. In some aspects, the multi-agent network and security operations system may include a planning module that autonomously generates network management plans and dashboard configurations based on user-defined outcomes. Using the planning module, users can schedule the actions or plans triggered at a specific date time. In some aspects, the planning module may prepare execution steps or dashboard widgets autonomously, may verify the availability of appropriate execution tools within the tools registry or other agents, may engage in a dialogue with the user for approval of the generated plans; and may implement the approved plans without further user intervention. The planning module may also use historical workflow data and machine learning algorithms to optimize the generated plans for efficiency and effectiveness before presenting them to the user. In some aspects, using the planning module, users can also command the system to monitor certain aspects in a semi-automated way, for example security or performance, and report only when required—in this case, agents may continuously work in the background and either notify or act when required. In some aspects, the system can generate plan and dashboards based on the user desired outcomes or even proactively suggesting those dashboards or plans based on it own knowledge (e.g., acquired though a recommender system) and this can be autonomous but also can be performed with an interactive session with the user to determine the best plan or the best charts for the dashboard. The multi-agent network and security operations system may enhance security through dynamic policy optimization and compliance monitoring, adhering to industry standards and regulations. In particular, the enhanced security of the multi-agent network and security operations system may proactively defend against evolving security threats with dynamic policies.

System Aspects

In some aspects, the multi-agent network and security operations system is designed to autonomously manage network operations through a combination of a supervising agent and specialized agents. The system architecture can be both modular and scalable, featuring key components including, but not limited to, supervising agent, specialized agents, communication protocols, and/or tools registry. For example, supervising agent may coordinate activities among specialized agents and ensure alignment with overall system objectives—it can dynamically switch between centralized and decentralized control depending on task complexity. Each specialized agent may be tailored to handle specific network management functions, such as security, optimization, troubleshooting, and performance monitoring. Specialized agents may collaborate and share insights to enhance overall system performance. Secure channels may be established for inter-agent communication using standardized encryption protocols to maintain data integrity and ensure secure operation. A centralized repository that may provide agents access to a wide range of tools, including content repositories, SQL/NoSQL/Graph databases, vector stores, search engines, real-time data streams, optimization mechanisms like reinforcement learning or genetic algorithms, causality techniques, and/or pre-defined machine learning models. This registry may support the seamless integration of new tools, enabling the multi-agent network and security operations system to evolve with technological advancements.

In some aspects, agents of the multi-agent network and security operations system may perform a range of autonomous tasks across the network lifecycle. Each agent may use AI algorithms and machine learning models (e.g., with explainable AI capability) to execute the operations including, but not limited to, data collection, data analysis, data prediction, data recommendations/prescription, decision making, action execution, and/or learning mechanisms. Specifically, agents may gather data from network devices, logs, environment, and user interactions in real time to maintain an updated view of network conditions. Agents, leveraging AI algorithms, may analyze the collected data to make informed decisions that can optimize network performance. Agents may implement changes, deploy configurations, or initiate workflows autonomously to resolve identified issues or optimize network conditions. Agents may leverage machine learning models to learn from outcomes and feedback, enabling continuous improvement and adaptation to changing network environments.

In some aspects, in addition to access to the user own data as well as the domain knowledge base, agents may have collective intelligence acquired through anonymized network operations and security data and practices from other network sites. This collective knowledge may also be used to train agents to make them more proactive and assertive in their recommendation and decisions.

In some aspects, the architecture of the multi-agent network and security operations system may emphasize modularity and security, facilitating easy integration of new agents and tools while ensuring robust performance. System components may be designed to be independently updatable or replaceable, allowing for incremental enhancements without disrupting modularity the overall multi-agent network and security operations system. The architecture may support horizontal scaling by adding more agents or computing resources, enabling the system to adapt to varying network sizes and complexities without system reconfiguration. The multi-agent network and security operations system may employ encryption and authentication protocols to secure data and ensure compliance with industry regulations—this may include secure communication between agents and safeguarding sensitive information.

In some aspects, the multi-agent network and security operations system may include, but is not limited to, a variety of specialized agents that work collaboratively to manage complex network tasks. The architecture may be adaptable, allowing the system to employ either a centralized or decentralized approach based on task requirements. For example, centralized architecture may involve a central agent that orchestrates the activities of subordinate agents. This centralized architecture may be efficient for tasks that require tight coordination or centralized control. Decentralized architecture may enable agents to operate independently or in a peer-to-peer manner, sharing information directly. This decentralized architecture may be suitable for complex tasks requiring scalability and robustness, as it avoids single points of failure. Adaptive architectural choice may enable the multi-agent network and security operations system to dynamically select between centralized, decentralized, or hybrid architecture (e.g., that involves centralized and/or decentralized architecture), optimizing performance and resource utilization based on the task's complexity and current network conditions. Table 1 provides an example and non-limiting list of agents of the multi-agent network and security operations system.

TABLE 1

| Agent - Description | |
|---|---|
| Example Agent | Example Agent Description |
| Dispatcher Agent | Routes tasks to appropriate agents, coordinating the network management process. |
| Knowledge Agent | Accesses content repositories and knowledge articles for network design, deployment, and troubleshooting. |
| Structured Data Agent | Analyzes real-time and historical data from APIs, databases, and data streams to generate actionable insights. |
| User Experience Agent | Customizes data visualization and presentation to enhance user understanding and interaction. |
| Security Optimization Agent | Analyzes security policies, access logs, and user behavior to enhance security with zero-trust principles. |
| Troubleshooting Agent | Identifies and resolves network issues by leveraging historical data and real-time monitoring. |
| Client Experience Agent | Optimizes client experience by monitoring metrics such as latency, jitter, and device performance. |
| Network Health Agent | Monitors network performance, device health, and topology to maintain optimal conditions. |

TABLE 1-continued

| Agent - Description | |
|---|---|
| Example Agent | Example Agent Description |
| AI-Based Configuration Optimization Agent | Recommends and applies optimal network settings based on current configurations and performance metrics. |
| Predictive Performance Agent | Utilizes AI models to anticipate network performance issues and proactively adjust configurations. |
| Anomaly Detection and Self-Remediation Agent | Detects anomalies in network behavior and initiates automatic remediation actions. |
| Automated Migration Agent | Facilitates seamless migration of configurations from third-party devices to optimize network performance and security. |
| Wireless Network Optimization Agent | Enhances user experience by optimizing wireless network settings. |
| Zero Trust Network Access (ZTNA) and Network Access Control (NAC) Policy Optimization Agent | Enhances security by analyzing and optimizing Zero Trust Network Access policies. |
| Network Design and Expansion Agent | Assists in planning and design phases for network deployment and scaling. |
| Automated Reporting and Compliance Agent | Generates automated reports for performance monitoring, compliance, and security audits. |
| Environmental Context Agent | Monitors external factors that could impact network performance, adjusting strategies as needed. |
| Analytical LLM Agent | Assesses real-time conditions and optimize communication pathways or processes based on querying LLMs. |
| ML Explainability Agent | Uses multimodality to explain results of ML models or states of the network. |
| Causality Agent | Establishes causal relationships to determine root causes by accessing different levels of data.<br>This agent may be based on evidence of the use of analytical LLM agent to determine causality by aligning tabular data with natural language, as well as the use of multi-agent systems for causal discovery using LLMs.<br>This agent would assist the ML Explainability Agent agent, as some techniques for explainability may be based on counterfactual. |
| Planner Agent | Transforms the user prompt into an executable plan, including the ability to send the plan for execution. |
| Stepwise Agent | Verifies, optimizes, and consolidates plans to ensure efficient execution. |

In some aspects, the architecture of the multi-agent network and security operations system may integrate at least action models, a tools registry, and serverless handlers to facilitate interaction between agents and network management tools. For example, action models may define the sequence of actions that agents undertake based on network conditions and user inputs. Serverless handlers may enable seamless interaction between agents and network management tools, allowing for scalable, flexible, and collaborative task execution. Adaptive learning and reflection may enable agents to continuously analyze outcomes and feedback to refine workflows and strategies, enhancing efficiency and effectiveness over time.

In some aspects, the multi-agent network and security operations system may provide risk mitigation and security features. For example, the multi-agent network and security operations system may employ encryption and secure authentication protocols to protect sensitive information. The multi-agent network and security operations system may be designed to handle agent failures without compromising overall system functionality, ensuring continuous operation. The multi-agent network and security operations system may ensure fairness and transparency in AI decision-making (e.g., explainable AI capability), minimizing bias and supporting ethical use. The multi-agent network and security operations system may adhere to data protection laws and regulations, including general data protection regulation (GDPR) and California consumer privacy act (CCPA), ensuring legal and ethical compliance in network management.

In some aspects, the multi-agent network and security operations system may include legal compliance and ethical considerations. For example, the multi-agent network and security operations system may comply with international data protection regulations, including GDPR and CCPA, to safeguard user privacy. The multi-agent network and security operations system may guarantee that AI decisions are explainable, unbiased, and aligned with ethical standards. The multi-agent network and security operations system may meet industry-specific compliance requirements, ensuring the system's deployment adheres to regulatory frameworks.

In some aspects, the multi-agent network and security operations system may be responsive to market potential and commercial viability. For example, the multi-agent network and security operations system may consider market needs. The growing complexity of network environments may create a demand for intelligent, autonomous network management solutions. The multi-agent network and security operations system may target medium and large enterprises, data centers, and cloud service providers seeking advanced network management capabilities. The unique combination of AI-driven autonomy, comprehensive management, and user-friendly interfaces may position the multi-agent network and security operations system as a transformative solution in the market. The multi-agent network and security operations system may provide revenue opportunity—potential revenue streams may include software licensing, cloud-based services, and support contracts for long-term system maintenance and enhancement.

The multi-agent network and security operations system may be built upon one or more of at least four aspects: AI-based data retrieval from APIs and visualization, AI-driven multi-agent system for autonomous network management, natural language-driven network workflow automation, and AI-driven interactive dashboards. With a combination of AI-based data retrieval from APIs and visualization, AI-driven multi-agent system for autonomous network management, natural language-driven network workflow automation, and AI-driven interactive dashboards, the AI-driven multi-agent network and security operations system represents a significant technological advancement in network management technology by providing autonomous, comprehensive, and adaptive solutions. Its unique combination of features addresses current limitations and positions it as a transformative innovation in the field.

AI-Based Data Retrieval from APIs and Visualization

The multi-agent network and security operations system that interprets natural language may query to select, call, and process data from multiple APIs. In response to user questions about their network data, the system may retrieve relevant information and generate charts, tables, and textual summaries for visualization. This may enable users to access and understand complex network information effortlessly. The system may access applications or user behavior data via multiple APIs. In addition, user might bring their own actions through connecting their own APIs.

In some aspects, the multi-agent network and security operations system may embed advanced natural language processing algorithms to understand and interpret use inquires and translate them into precise API calls.

In some aspects, the multi-agent network and security operations system may support intelligent API orchestration that may dynamically select and interact with multiple APIs to gather comprehensive network data based on the user's request. For example, the multi-agent network and security operations system may select an API or group of APIs required to answer the user's request—this may involve not only API selection but also parameters analysis and contextual resolution, i.e. user query or request may be answered with endpoint A from a first API but may require parameter information that needs to be gathered using endpoint B from a second API. The multi-agent network and security operations system can, by itself autonomously and without human or hardcoded instructions, execute the full contextual resolutions to get the data required.

In some aspects, the multi-agent network and security operations system may support automated data visualization that may process retrieved data to create insightful charts, tables, and textual summaries. For example, once the data coming from one or more endpoints and/or APIs is receive, usually in a JavaScript Object Notation (JSON) format, the multi-agent network and security operations system may convert it into a set of relational tables by analyzing the JSON hierarchy. The multi-agent network and security operations system may also include it in an in memory SQL database and may then generate autonomously a SQL query to perform all joins, aggregations, stats, and/or data manipulation to produce the content for answering the user query or request. This content may be sent to the user experience (UX) agent to analyze the best way (e.g., text, table, charts of a combination of those and include titles, labels, column names, etc.) to provide the answer to the user in the most intelligible way.

In some aspects, the multi-agent network and security operations system may provide up-to-date network information by accessing and aggregating data from various APIs in real-time manner. By seamlessly converting user queries into coordinated API interactions and automatically generating visualizations, the system can enhance user interaction and simplify the understanding of complex network data.

AI-Driven Multi-Agent System for Autonomous Network Management

The multi-agent network and security operations system may include multiple specialized GenAI agents that collaborate to autonomously manage network operations. This system may include, but is not limited, to planning and design, deployment, operations, security enforcement, and/or optimization. Specifically, the system may assist in network topology design and capacity planning. The system may automate the rollout of network devices and configurations. The system may monitor performance, detect anomalies, and optimize configurations. The system may also implement zero-trust security models (e.g., a security model that assumes no implicit trust and verifies everything) and adjusting policies dynamically. The system may additionally continuously improve network performance using predictive analytics.

In some aspects, the multi-agent network and security operations system may allow multi-agent collaboration in which specialized GenAI agents collaborate to address complex network tasks, enhancing efficiency and adaptability. The system may support adaptive collaboration between agents in which different agents may adjust roles and strategies based on evolving network environments. In some aspects, this system may support autonomous operation in which the system may plan and execute complex workflows without human intervention, adjusting to real-time network conditions. The system may support comprehensive autonomy in which the system may autonomously manage the entire network lifecycle. In some aspects, this system may support dynamic planning and execution in which the system may execute multi-step plans dynamically, adapting workflows based on changing data and environments. In some aspects, the system may support reflection and self-optimization in which the system may incorporate mechanisms for agents to evaluate performance, learn from outcomes, and refine workflows. In some aspects, the system may support predictive performance monitoring in which the system may utilize historical and real-time data to anticipate network issues and implement proactive remediation. In some aspects, the system may support autonomous configuration optimization in which the system may adjust network configurations for optimal performance across various devices and scenarios. In some aspects, the system may also dynamic policy optimization in which the system may adjusts network policies in real-time to enhance performance, sustainability, security and cost. In some aspects, the system may additionally support seamless security integration in which the system may incorporate zero-trust security policies with dynamic policy optimization to enhance security. The system may support dynamic security integration to apply real-time adaptation of security measures using zero-trust principles.

This AI-driven multi-agent system may represent a significant technological advancement by unifying autonomous operation, dynamic workflow management, self-optimization, and comprehensive coverage of network management tasks into a single platform. The integration of these features may enable proactive monitoring, predictive issue resolution, autonomous configuration optimization, and integrated security management, surpassing the capabilities of network and security operations systems.

Natural Language-Driven Network Workflow Automation

The multi-agent network and security operations system may translate natural language inputs into executable workflows using Directed Acyclic Graphs (e.g., a finite directed graph with no cycles, used for workflows)—this system may not only capture human intentions but also can learn from previously created workflows. Specifically, leveraging a comprehensive knowledge base, the system may assist users in transforming desired outcomes into detailed plan steps. Through interactive dialogues, the system may collaborate with the user to craft the most effective plan. The system may also review its own and other agents' sets of tools to determine if the plan can be executed autonomously, proposing modifications to achieve full autonomy with the available resources.

In some aspects, the multi-agent network and security operations system may support advanced natural language understanding (e.g., AI's ability to understand human language) in which the system may utilize sophisticated natural language understanding and machine learning algorithms to interpret user commands and translate them into actionable workflows covering all aspects of the network's lifecycle. In some aspects, the system may support outcome-to-plan transformation in which the system may assist users in developing detailed plans from specified outcomes by engaging in interactive discussions to refine and optimize each step. In some aspects, the system may support learning from past workflows in which the system may analyze historical workflows to enhance current workflow generation, drawing on successful strategies and avoiding past pitfalls. In some aspects, the system may support collaborative planning dialogue in which the system may engage users in conversations to co-create the best possible plan, ensuring that user intentions are accurately captured and implemented. In some aspects, the system may support autonomous execution assessment in which the system may review available tools within its own and other agents' repositories to determine if the plan can be executed autonomously, suggesting modifications to achieve full automation when necessary. In some aspects, the system may also support interactive execution in which the system may adapt workflows dynamically by incorporating real-time user input and responding to changing network conditions during execution. In some aspects, the system may additionally support self-Optimization in which the system may continuously refine workflows based on user feedback, system performance metrics, and accumulated knowledge, improving efficiency over time.

The multi-agent network and security operations system's ability to interpret natural language and autonomously create complex, executable workflows is significantly enhanced by its capacity to learn from historical workflows and collaborate with users in planning. By transforming desired outcomes into optimized plans through interactive dialogue and ensuring autonomous execution with available tools, embodiments herein represent a novel approach to workflow automation in network management.

AI-Driven Interactive Dashboards

The multi-agent network and security operations system may facilitate the creation and management of interactive network monitoring dashboards using natural language commands. For example, the interactive network monitoring dashboards may engage in contextual dialogues with one or more users, utilize the network configuration data and one or more tools of the plurality of specialized agents to provide enhanced insights and investigative information, and allow the one or more users to set one or more natural language-based actions that trigger responses when specific network metrics meet one or more predefined conditions.

Dashboards can be generated directly from conversations between a user and the multi-agent network and security operations system. When a user engages in a dialogue and presses the "convert to dashboard" button, the data-related questions may be transformed into executable dashboard widgets that are continuously refreshed with new data. The system may also support outcome-based dashboard creation. Users can request an outcome-related dashboard (e.g., "a dashboard to monitor client experience"), and the system may recommend the best set of widgets based on learning from other dashboards, the knowledge base, user context, and available agent tools. Furthermore, users may have the ability to interact directly with individual widgets. They can interrogate a widget to delve deeper into its insights, and the system may contact the appropriate agent to answer the user's questions. Dashboards are actionable; users can set actions in natural language that trigger when particular metrics or groups of metrics behave in certain ways. These actions can range from notifications to direct network adjustments or even trigger third-party services, similar to "if this then that" systems.

In some aspects, the multi-agent network and security operations system may support conversational dashboard creation in which the system may allow users to create dashboards directly from their conversations with the system. By pressing "convert to dashboard," data-related dialogues may be transformed into dynamic widgets. For example, the original agent based response including an original generation of the chart by calling LLMs for multiple times to decide a right tool use, the right parameters to configure the tool, and/or decisions about data manipulation like aggregations, may join to produce final dataset as well decisions about chart title, labels, and etc. The conversion of conversation to widget may involve the multi-agent network and security operations system to generate an executable recipe that ensure reproducibility, performance and low cost but eliminating redundant decision making steps in each widget execution. This is critical to emulate a human create dashboard behavior and user expectations of consistency and performance.

In some aspects, a widget recipe from the original user question may be regenerated in case the current recipe fails due to changes in the tools (e.g., when a version of an external API has changed which introduces non-backward compatible endpoints or database version schema). For example, if recipe execution fails, the widget recipe can be automatically restored without human intervention.

In some aspects, the extracted recipes may be executable instructions independent of the LLMs or other agents to keep dashboard execution low cost. Nevertheless, the system may stores the original user question that generated the recipe, so in case the underlying systems change, for example the recipe may imply calling certain external APIs and these one changes and the change may be registered in the tools registry, the system may be able to trigger the conversion from question to recipe again with the updated tools from the tool registry. This make the system not only low cost but also self-maintainable over time, including when underlying tools change. This is a great technological advance if compared with human build dashboards that will require human intervention on any APIs or data source changes.

In some aspects, the system may support outcome-based generation of the dashboards in which the system may allow users to request dashboards based on desired outcomes or purposes, for example, a security monitoring dashboard. For example, the system may recommend widgets and discuss with the user a final set of them after generating the dashboard, by learning from previous dashboards, leveraging the knowledge base, user context, and agent tool availability. Specifically, the recommendation of widgets may either be from inference using agent tools like a ML based recommender system or with knowledge acquired by fine-tuning the LLM itself.

In some aspects, the system may support interactive widget engagement—with features of deep dive interrogation and dynamic updates. The system may dynamically update widgets by refreshing data periodically or being triggered by any events. The system may suggest the optima refresh period of a widget based on the system knowledge on data variability—the best option to ensure lower cost while keeping system up to date may be only refreshing data when needed. For example, the system may configure the refreshing of a widget based on identifying when a change happens. System device stats may be refreshed every hour but security threads may be refreshed at real-time.

The system may also allow users to interact with individual widgets to explore deeper insights. The system may contact the appropriate agent to provide detailed answers. For example, the system may allow users to interact and interrogate with the widgets in which the users may use widget data as a context to contact the right agent to retrieve additional information to answer a user question, and allow the designated agent to use the context and/or new information to perform analysis, explanations, recommendations, and/or execute any actions.

In some aspects, the system may support actionable dashboards—with features of natural language automation and automated responses. The system may allow users to set up actions in natural language that occur when specific metrics meet certain conditions. The system, with automated responses, may allow actions to range from sending notifications to executing network adjustments or triggering third-party services, enabling an "if this then that" functionality. The system also allow users to register their own API based actions, including the use of external APIs, for example, if dashboard shows no clients connected to API, the system may turn off the office light. The system may automatically turn it back on once a client connects to the API. In some aspects, the system may also support conversational and intuitive interface in which the system may allow users to monitor and manage the dashboard through natural language, enhancing accessibility and ease of use. In some aspects, the system may support real-time interaction and automation in which the widgets may be continuously refreshed with new data, ensuring real-time accuracy. The system may additionally enable users to set up real-time monitoring tasks and receive immediate feedback or actions based on any network events.

The multi-agent network and security operations system's ability to convert natural language conversations into dynamic, interactive dashboards represent a significant technology advancement in user-centric network management. By transforming dialogues into actionable data visualizations, it may enhance user interaction and operational insights. The capability to create dashboards based on desired outcomes, recommending widgets through learned insights from past dashboards and knowledge bases, may further personalize the user experience. Additionally, the feature allowing users to interact directly with widgets to gain deeper insights, and to set natural language actions that can affect both network operations and third-party integrations, may offer unprecedented flexibility and control in network management.

Example Scenarios of the Multi-Agent Network and Security Operations System

Use Case 1: Real-Time Anomaly Detection and Self-Remediation

Agents Involved:
- Anomaly Detection and Self-Remediation Agent
- Network Health Agent
- Structured Data Agent
- Dispatcher Agent
- Causality Agent Architecture: Decentralized Scenario:
- Task Complexity: High—may require real-time data analysis and immediate response across different network segments, and causal analysis to determine root causes.
- Execution
  - Data Collection:
    - i. The Network Health Agent and Structured Data Agent may operate on various network nodes, collecting real-time performance metrics and device health data.
  - Local Anomaly Detection:
    - i. Multiple instances of the Anomaly Detection and Self-Remediation Agent may run on different network segments.
    - ii. Each agent may analyze local data to detect anomalies like unusual traffic patterns or device failures.
    - iii. Causality Agent may provide insights by linking anomalies to potential root causes across different data levels, helping in faster and more accurate detection.
  - Decentralized Collaboration:
    - i. Upon detecting an anomaly, agents may communicate directly with neighboring agents to assess the scope.
    - ii. Agents may coordinate actions without central oversight, deciding whether to isolate the issue or reroute traffic.
    - iii. Causality Agent may enhance collaboration by providing causal links that can help agents understand if detected issues are symptoms of a broader problem, guiding coordinated responses.
  - Self-Remediation:
    - i. Agents may initiate remediation steps autonomously, such as resetting devices or adjusting configurations.
    - ii. Causality Agent may help prioritize remediation steps by identifying the most likely causes, ensuring that the actions taken can be targeted at the root issue, not only the symptoms.
  - Reporting:
    - i. Agents may send summary reports to the Dispatcher Agent for logging and alerting administrators.

ii. Causality Agent may assist in creating detailed reports, explaining the causal relationships and providing insights into why specific issues may be occurred.

Technological Benefits

Scalability: Can handle large-scale networks efficiently.

Fault Tolerance: Can enhance reliability without single point of failure.

Speed: Immediate detection and response without central bottlenecks.

Causal Insights: Can provide deeper understanding of anomalies and enable more effective remediation by identifying root causes.

Use Case 2: Scheduled Network Configuration Optimization

Agents Involved:

- AI-Based Configuration Optimization Agent
- Coding Agent
- User Experience (UX) Agent
- Dispatcher Agent Architecture: Centralized Scenario Task Complexity: Moderate—may involve analyzing configurations and applying optimizations during maintenance windows.

Execution

Task Scheduling:

i. The Dispatcher Agent may schedule the optimization task during off-peak hours.

Central Analysis:

i. The AI-Based Configuration Optimization Agent may centrally collect current configurations and performance metrics.

Optimization Planning:

i. The agent may analyze data to identify optimization opportunities, such as adjusting bandwidth allocations or updating routing protocols.

ii. The agent may identify optimization rules (e.g., AI generated optimization rules) in which instead of upgrade all network devices at once, less critical zones may be tested and updated first.

API calls determination:

i. The agent may invoke the structured data handler agent to determine the right APIs calls to perform the optimization actions for implementing configuration changes.

Script Generation:

i. The agent may also collaborate with the Coding Agent to generate the necessary scripts for implementing configuration changes.

User Review:

i. The UX Agent may present the proposed changes to network administrators for approval.

Implementation:

i. Upon approval, the AI-Based Configuration Optimization Agent may apply the new configurations.

Post-Implementation Monitoring:

i. The agent may monitor the network to ensure that optimizations have the desired effect.

Technological Benefits

Consistency: Central control can ensure uniform application of configurations.

Resource Efficiency: Can optimize network performance during low-traffic periods.

Simplified Management: Easier oversight and rollback if necessary.

Use Case 3: Security Policy Management with Zero Trust Principles

Agents Involved:

- Security Optimization Agent
- ZTNA and NAC Policy Optimization Agent
- Knowledge Agent
- Dispatcher Agent Architecture: Hybrid Scenario Task Complexity: High—may require both global policy analysis and local enforcement across multiple network segments.

Execution

Policy Analysis (Centralized):

i. The Security Optimization Agent may centrally review existing security policies using information from the Knowledge Agent.

ii. The Security Optimization Agent may identify gaps and areas for improvement in line with zero-trust principles.

iii. The Security Optimization Agent might identify opportunities for policy consolidations to minimize maintenance efforts.

Policy Distribution:

i. Updated policies may be disseminated to the ZTNA and NAC Policy Optimization Agents operating on different network segments.

Local Enforcement (Decentralized):

i. These agents may implement the policies locally, adjusting access controls and monitoring user behavior.

ii. These agents may operate autonomously to enforce policies effectively within their segments.

Collaboration and Reporting:

i. Agents may communicate with each other to ensure consistency and share insights on potential threats.

ii. Reports may be sent back to the Dispatcher Agent for centralized logging and compliance tracking.

Adaptive Response:

i. If a security threat is detected, local agents can take immediate action, such as isolating a compromised device.

Technological Benefits

Enhanced Security: Can combine strategic oversight with tactical enforcement.

Scalability: Can adapt to large networks with multiple segments.

Flexibility: Can allow for rapid local responses while maintaining global policy alignment.

Use Case 4: Client Experience Optimization in Wireless Networks

Agents Involved:

- Wireless Network Optimization Agent
- Client Experience Agent
- Predictive Performance Agent
- Environmental Context Agent
- Dispatcher Agent
- ML Explainability Agent Architecture: Decentralized Scenario Task Complexity: High—may require real-time adjustments based on client behavior, environmental factors, and explainable AI insights.

Execution

Data Gathering:

i. The Client Experience Agent may monitor metrics like signal strength, latency, and device performance from client devices.

ii. The Environmental Context Agent may collect data on factors like interference sources or physical obstructions.

Predictive Analysis:

i. The Predictive Performance Agent may use AI models to anticipate potential performance issues.

ii. ML Explainability Agent may provide transparency by explaining the predictions made by the Predictive Performance Agent, ensuring that network administrators can understand why certain adjustments are being suggested.

Local Optimization:

i. The Wireless Network Optimization Agent may adjust wireless settings (e.g., channel selection, transmit power) on access points.

ii. These adjustments may be made autonomously to improve client experience.

iii. ML Explainability Agent may provide insights into how these adjustments can impact performance, helping to understand the relationship between the adjustments and network metrics.

Peer Collaboration:

i. Agents may share information directly with neighboring agents to coordinate settings and avoid interference.

ii. ML Explainability Agent may assist by explaining the shared data and actions, ensuring alignment across agents.

Continuous Monitoring:

i. Agents may continuously monitor the impact of adjustments and make further changes as needed.

Minimal Central Involvement:

i. The Dispatcher Agent may only be involved for high-level reporting and may not direct the optimization process.

ii. ML Explainability Agent may assist in generating explainable reports based on optimization and monitoring outcomes.

Technological Benefits

Improved User Experience: Can enhance connectivity and performance for end-users.

Adaptive Response: Can quickly adjust to changing conditions without central delays.

Efficiency: Can reduce network congestion and interference through coordinated actions.

Use Case 5: Automated Reporting and Compliance Management

Agents Involved:

Automated Reporting and Compliance Agent

Knowledge Agent

User Experience (UX) Agent

Dispatcher Agent

Architecture: Centralized

Scenario

Task Complexity: Low to Moderate—may involve generating regular compliance reports and performance summaries.

Execution

Data Aggregation:

i. The Automated Reporting and Compliance Agent may centrally collect data from various network components via the Knowledge Agent.

Report Generation:

i. The Automated Reporting and Compliance Agent may compile data into reports required for compliance with industry regulations and internal policies.

Customization:

i. The UX Agent may format the reports for clarity and ease of understanding, adding visualizations as needed.

Scheduling and Distribution:

i. The Dispatcher Agent may schedule reports to be generated and sent to relevant stakeholders at specified intervals.

Compliance Verification:

i. The agent may check that all data and reporting meet necessary compliance standards before distribution.

Technological Benefits

Consistency: Can ensure all reports are standardized.

Compliance Assurance: Can reduce risk of non-compliance penalties.

Efficiency: Can automate routine tasks, freeing up human resources for more complex activities.

Use Case 6: Automated Network Design and Expansion Planning

Agents Involved:

Network Design and Expansion Agent

Wireless Network Optimization Agent

Security Optimization Agent

Knowledge Agent

Environmental Context Agent

User Experience (UX) Agent

AI-Based Configuration Optimization Agent

Dispatcher Agent

Architecture: Hybrid

Scenario

Task Complexity: High—may require comprehensive planning that balances technical requirements, security considerations, environmental factors, and budget constraints for a large-scale network deployment.

Execution

Requirements Gathering (Centralized):

i. The Network Design and Expansion Agent may collect detailed requirements from stakeholders via the User Experience (UX) Agent.

Information includes:

i. Number of buildings and their layouts.

ii. Number of users and device density in different areas.

iii. Specific functional requirements (e.g., high-bandwidth areas, guest networks).

iv. Floor plans and architectural layouts.

v. Budget constraints and financial considerations.

vi. Compliance and security requirements.

vii. Future scalability and expansion plans.

Data Collection:

i. The Knowledge Agent may access design best practices, equipment specifications, and historical data on similar network deployments.

ii. The Environmental Context Agent may analyze physical constraints, building materials affecting wireless signal propagation, and potential sources of interference (e.g., neighboring networks, electronic equipment).

Budget Analysis:

i. The AI-Based Configuration Optimization Agent may evaluate cost factors, including but not limited to equipment pricing (routers, switches, access points), installation and cabling costs, and/or maintenance and operational expenses.

ii. May ensure the proposed design aligns with budget constraints without compromising essential features.

Design Proposal:

i. The Network Design and Expansion Agent may develop a comprehensive network design, including but not limited to, wired network topology with core, distribution, and access layers, detailed cabling plans for Ethernet and fiber connections, hardware specifications for routers, switches, and servers.

ii. The Wireless Network Optimization Agent may design the wireless network by at least determining optimal access point placement for full coverage and capacity, planning for high-density areas like conference rooms or auditoriums, and/or selecting appropriate wireless technologies (e.g., Wi-Fi 6, mesh networking).

iii. The Security Optimization Agent may integrate security measures to at least implement network segmentation for different user groups (e.g., employees, guests), recommend firewalls, intrusion detection systems, and secure authentication methods, and/or ensure compliance with relevant data protection regulations.

Collaboration with Local Agents (Decentralized):

i. Agents may interact with local site survey data and facilities management systems to at least adjust designs based on real-world constraints, coordinate with construction schedules or existing infrastructure, and/or account for future expansion possibilities.

Optimization and Simulation:

i. The AI-Based Configuration Optimization Agent may run simulations to at least predict network performance under various load conditions, identify potential bottlenecks or coverage gaps, and/or optimize configurations for both wired and wireless components Feedback Loop:

i. The proposed design may be presented to stakeholders via the UX Agent for at least interactive visualizations of network layouts and coverage maps, cost breakdowns and justifications for equipment choices, security features and compliance reports, collected and incorporated stakeholder feedback, adjustments made for budget revisions or additional requirements, and/or alternative solutions proposed for any identified issues.

Finalization and Implementation Planning:

i. The Network Design and Expansion Agent may finalize the design documents, including but not limited to, detailed blueprints and schematics, and/or equipment lists with suppliers and part numbers.

Implementation timelines and milestones:

i. The Dispatcher Agent may coordinate deployment tasks.

ii. May assign roles to installation teams and subcontractors.

iii. May schedules work to minimize disruption to ongoing operations.

Deployment and Configuration:

i. Installation teams may set up the physical infrastructure as per the design.

ii. The Wireless Network Optimization Agent (#14) and Security Optimization Agent may at least configure devices with optimized settings, implement security protocols and access controls, and/or test network performance and security measures.

Post-Implementation Monitoring and Optimization:

i. Agents may continuously monitor network performance.

ii. May adjust configurations in response to real-world usage patterns.

iii. May address any unforeseen issues or user feedback.

iv. The Environmental Context Agent may remain active to at least detect new interference sources or environmental changes, and/or recommend adjustments to maintain optimal performance.

Technological Benefits

Comprehensive Planning: can combine strategic network design with detailed local considerations and environmental factors.

Stakeholder Engagement: can involve stakeholders throughout the process for better alignment with organizational needs.

Scalability: can designs the network with future expansion in mind, allowing for easy upgrades and additions.

Budget Compliance can ensures the network design meets technical requirements without exceeding budget constraints.

Enhanced Security: can integrates robust security measures from the outset, reducing vulnerabilities and ensuring compliance.

Optimized Performance: can utilize AI-driven optimization for both wired and wireless networks to ensure high performance and reliability.

Adaptive Response: agents can make real-time adjustments post-deployment to adapt to changing conditions or requirements.

Embodiments herein are directed to a multi-agent network and security operations system, and more particularly to an AI-driven multi-agent network and security operations system to create autonomous, efficient, and adaptive solutions capable of performing complex tasks across the entire network spectrum with minimal human intervention, enhancing efficiency, reliability, scalability, and security in network operations. These and other aspects of the present disclosure will be described in further detail below with respect to the accompanying drawings.

FIG. 1 is a block diagram of a multi-agent network and security operations system 100, according to aspects of the present disclosure. In some aspects, multi-agent network and security operations system 100 (the system) may include, but is not limited to, a central supervising agent 102, a decentralized agent A 104, a decentralized agent B 106, a decentralized agent C 108, a tools registry 110, action models 112, a knowledge base 114, and/or a user interface 116.

In some aspects, central supervising agent 102 may interface with the user and coordinate tasks. In some aspects, the user may send request to one or more agents (including central supervising agent 102). The one or more agents may work on the request. When part of the execution might imply disambiguate, the one or more agents may ask the user to take a decision to continue with working on the request. i.e., the system may seek for a user input at any time during the execution. For example, central supervising agent 102 may assign tasks to decentralized agent A 104. Decentralized agent A 104 may operate to process the assigned task and then return the results/updates of the task back to central supervising agent 102. In some aspects, central supervising agent 102 may also assign tasks to decentralized agent B 106 or decentralized agent C 108 due to the complexity and nature of the task. Decentralized agent B 106 or decentralized agent C 108 may operate to process the assigned task and then return the results/updates of the task back to central supervising agent 102. In some aspects, for example, a user experience agent may communicate to a dispatcher agent who is in charge routing the task to the right agents to start the process. This task can be routed to central supervising agent 102 and central supervising agent 102 may initiate a centralized approach to outline the plan and send the steps to the specialized agents, being a communication between the specialized agents and central supervising agent 102 who is in charge to orchestrate the task flow. In some aspects, the dispatcher agent can also send the task right a way to an specializes agent who may come with a plan and try to execute, in which the dispatcher agent might communicate directly with other agents when requiring some help in a peer to peer communication.

In some aspects, decentralized agents may collaborate with each other while operate autonomously at each side. For example, decentralized agent A 104 may collaborate with decentralized agent B 106 after receiving the assigned task from central supervising agent 102. Decentralized agent A 104 may also coordinate actions with decentralized agent C 108 in order to process the assigned task. In addition, decentralized agent B 106 may share data with decentralized agent C 108 while processing the assigned task. It would be appreciated by a person having ordinary skill in the art that the numbering of decentralized agents may be different.

In some aspects, multi-agent network and security operations system 100 may share resources between different agents. Shared resources of multi-agent network and security operations system 100 may include tools registry 110, action models 112, and knowledge base 114. For example, tools registry 110 may include but is not limited to APIs, databases, and/or other tools accessible by agents. In particular, the databases may include a shared multilevel memory—a dynamic memory system used across different time scales (long-term and short-term) and across multiple actors or agents. In some aspects, tools registry 110 may also contain also pre-trained ML models, API specifications, and/or any other tools (e.g., functions) available to the agent. In some aspects, tools themselves (except the knowledge base) may be external to multi-agent network and security operations system 100, but by having them in the register, agents may have access to these tools. Examples of the tools may include but are not limited to Databases, APIs to GET or POST//PUT/DELETE actions, Data Streams, ML models already trained and ready for inference, and/or mathematical network models. Action models 112 may include but is not limited to pre-defined machine learning models and action scripts. In some aspects, action models 112 can be part of the system or can be external tools accessed by the system in which action models 112, as any other tools or knowledge base 114, may be registered in tools registry 110. Knowledge base 114 may store information for agents to make informed decisions. In some aspects, 80% of the agent's knowledge or behavior may be associated with knowledge base 114 and tools registered in tools registry 110 for the agents.

In some aspects, knowledge base 114 may be a tool registered in tools registry 110. Knowledge base 114 may have different components for each agent depending on their role or specialization (e.g., might have shared components). Knowledge base 114 may be internal of multi-agent network and security operations system 100 to constitute the core knowledge of every agent.

In some aspects, central supervising agent 102 may access tools from tools registry 110. Central supervising agent 102 may also retrieve information from knowledge base 114. In some aspects, decentralized agent A 104 may use tools in tools registry 110. Decentralized agent B 106 may execute models from action models 112. It would be appreciated by a person having ordinary skill in the art that all the agents (e.g., not only the agents shown in FIG. 1) may have access to tools registry 110, as each one individually may have a set of tools available to them depending on their own functions and the context (e.g., from example user role). In some aspects, the tools available or assigned to an agent may be shared by one or more other agents if they function in a similar way.

In some aspects, multi-agent network and security operations system 100 may include a user interface 116 that allows users to interact with the system. For example, central supervising agent 102 may send user comments and/or feedbacks to user interface 116. The user interface 116 may allow agents to learn from user comments and feedbacks, enabling continuous monitoring, update, and improvement of the system to changing network environments. In some aspects, user interface 116 may include an interaction among user, agent, and LLM. The agent may interact with the LLM as the user, without the action of the user—but the LLM may be trained to interact with users, so the prompts inside the agents may be written as it is a human.

Figure 2:
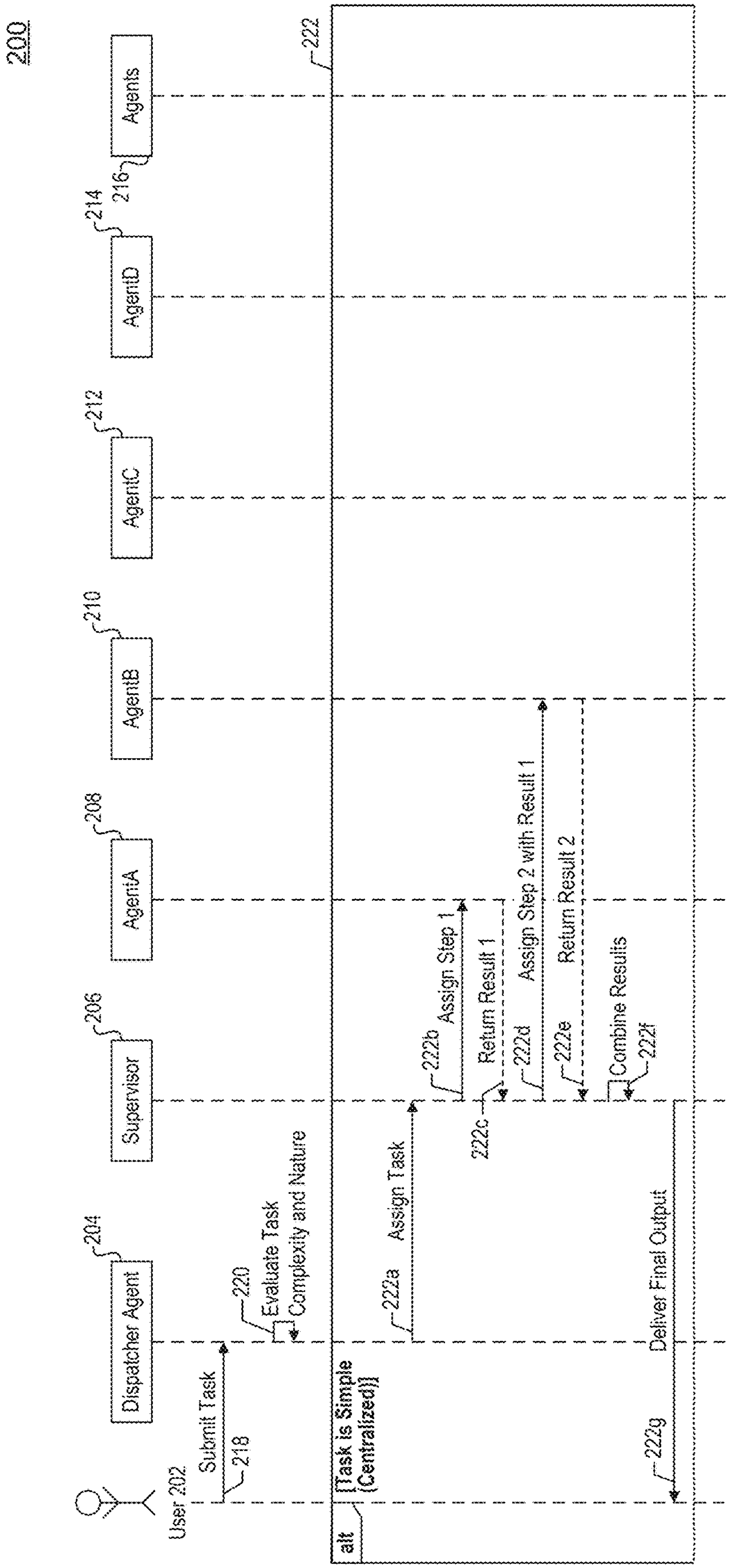
FIG. 2 is an example illustrating a central architecture with a supervising agent coordinating specialized agents, according to aspects of the present disclosure.

FIG. 2 is an example 200 illustrating a central architecture with a supervising agent coordinating specialized agents, according to aspects of the present disclosure. In some aspects, the central architecture may include but is not limited to a dispatcher agent 204, a supervisor 206, an agent A 208, an agent B 210, an agent C 212, an agent D 214, and/or other agents 216.

In 218, when a user 202 submits a task to multi-agent network and security operations system 100 (the system), a dispatcher agent 204 associated with the system may receive the task.

In 220, dispatcher agent 204 may evaluate task complexity and nature to decide an optimal architecture to be used for the task. In some aspects, a centralized architecture may be adapted, in 222, if the task is determined as simple.

In 222*a*, when the task is determined as simple, dispatcher agent 204 may assign task to a supervisor 206 (e.g., a central supervising agent). Supervisor 206 may interface with user 202 and coordinate the assigned task.

In some aspects, supervisor 206 may coordinate the task as one or more steps (e.g., step one, step two, and etc.). For example, in 222*b*, supervisor 206 may assign step one to agent A 208 (e.g., a decentralized agent), and in 222*d*, supervisor 206 may assign step two to agent B.

In 222*c*, agent A 208 may return result one back to supervisor 206 after operation, and in 222*e*, agent B 210 may return result two back to supervisor 206 after operation.

In 222*f*, supervisor 206 may also combine results from different agents, and in 222*g*, supervisor 206 may then deliver the final results/outputs back to user 202. Only agent A 208 and agent B 210 are illustrated in FIG. 2 for simplicity in which the further collaboration between supervisor 206 and any other agents in the centralized architecture would be appreciated by a person having ordinary skill in the art.

Figure 3:
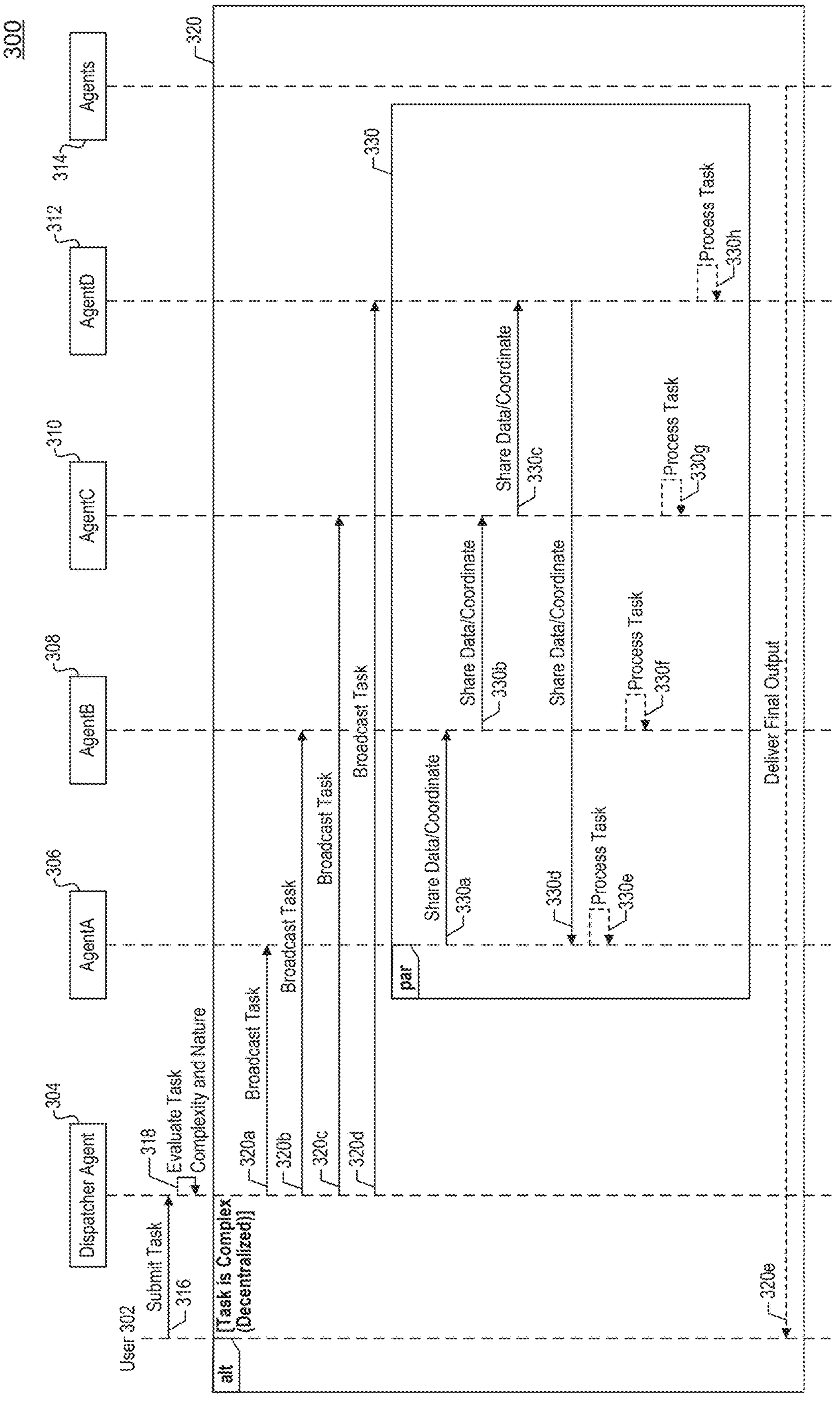
FIG. 3 is an example illustrating a decentralized architecture with agents communicating directly with each other in a peer-to-peer manner, according to aspects of the present disclosure.

FIG. 3 is an example 300 illustrating a decentralized architecture with agents communicating directly with each other in a peer-to-peer manner, according to aspects of the present disclosure. In some aspects, the decentralized architecture may include, but is not limited, to a dispatcher agent 304, an agent A 306, an agent B 308, an agent C 310, an agent D 312, and/or other agents 314.

In 316, when a user 302 submits a task to multi-agent network and security operations system 100 (the system), a dispatcher agent 304 associated with the system may receive the task.

In 318, dispatcher agent 304 may evaluate task complexity and nature to decide an optimal architecture to be used for the task. In some aspects, a decentralized architecture may be adapted, in 320, if the task is determined as complex. In some aspects, such complex task may be distributed among one or more agents that collaborate with each other. A broadcast form may be a powerful tool to distribute tasks to a designated group, allowing any agents within that group to pick up and work on the task.

In 320*a*, dispatcher agent 304 may broadcast task to agent A 306. In 320*b*, dispatcher agent 304 may broadcast task to agent B 308. In 320*c*, dispatcher agent 304 may broadcast task to agent C 310. In 320*d*, dispatcher agent 304 may broadcast task to agent D 312.

In 330, within the decentralized architecture, different agents may share data with or coordinate between each other. For example, in 330*a*, agent A 306 may share data or coordinate with agent B 308. In 330*b*, agent B 308 may share data or coordinate with agent C 310. In 330*c*, agent C 310 may share data or coordinate with agent D 312. In 330*d*, agent D 312 may also share data or coordinate with agent A 306.

In some aspects, each agent may then process the broadcasted task after data sharing or any coordination by themselves. For example, in 330*e*, agent A 306 may process the broadcasted task. In 330*f*, agent B 308 may process the broadcasted task. In 330*g*, agent C 310 may process the broadcasted task. In 330*h*, agent D 312 may process the broadcasted task.

In 320*e*, agent A 306, agent B 308, agent C 310, agent D 312, and/or one of other agents 314 may, after processing the broadcasted task, return the results for each broadcast task back to user 302.

Figure 4:
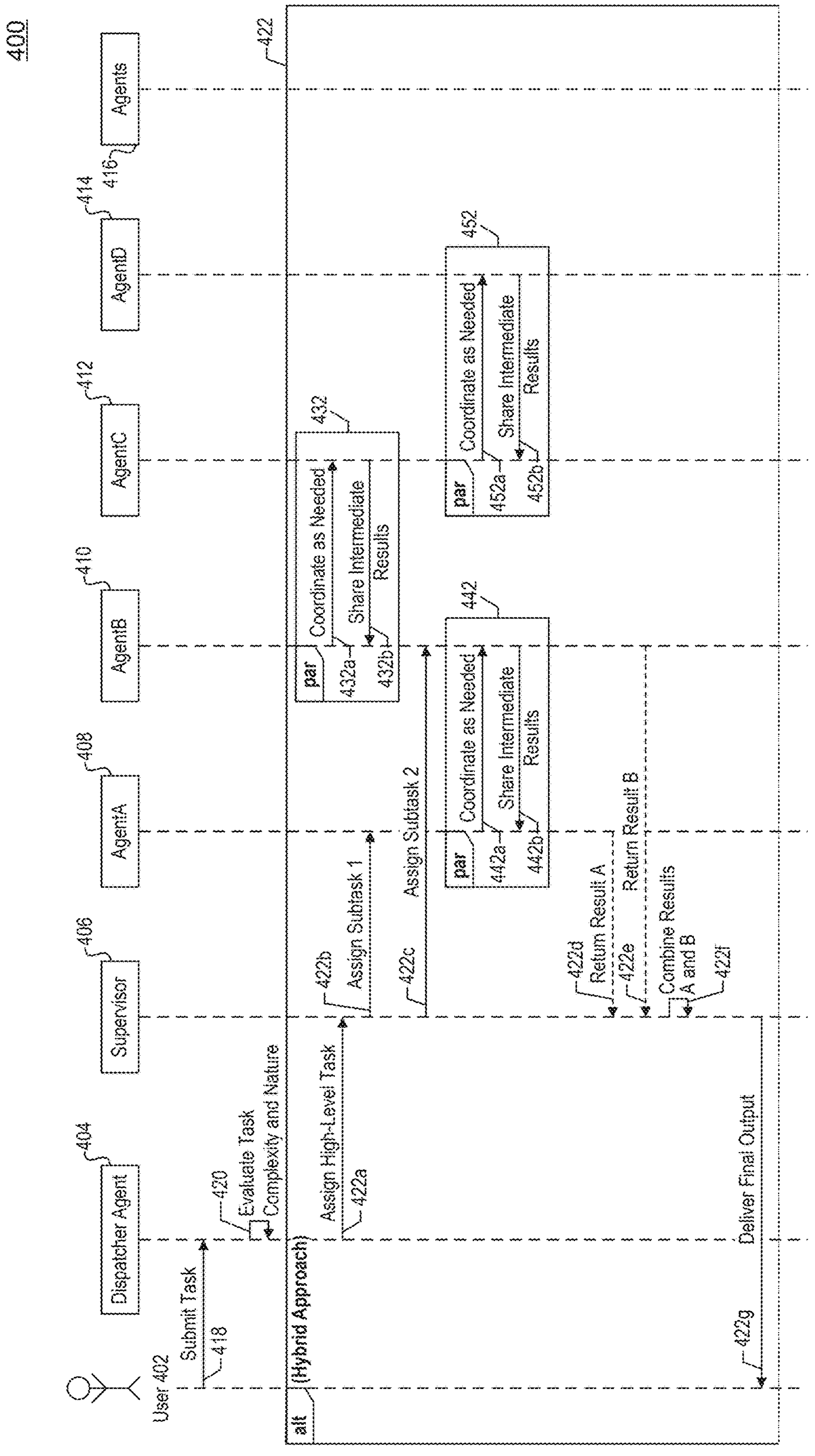
FIG. 4 is an example illustrating a hybrid scenario with both centralized and decentralized elements are employed, according to aspects of the present disclosure.

FIG. 4 is an example 400 illustrating a hybrid scenario with both centralized and decentralized elements are employed, according to aspects of the present disclosure. In some aspects, the hybrid scenario may include but is not limited to a dispatcher agent 404, a supervisor 406, an agent A 408, an agent B 410, an agent C 412, an agent D 414, and/or other agents 416.

In 418, when a user 402 submits a task to multi-agent network and security operations system 100 (the system), a dispatcher agent 404 associated with the system may receive the task.

In 420, dispatcher agent 404 may evaluate task complexity and nature to decide an optimal architecture to be used for the task. In some aspects, a hybrid scenario with both centralized and decentralized elements may be employed, in 422, combining the advantages of both centralized and decentralized architectures. Specifically, high-level task/objectives may be managed using a centralized architecture, while subtasks may be handled using a decentralized architecture.

In 422*a*, dispatcher agent 404 may assign a high-level task to a supervisor 406. Supervisor 406 may then interface with user 402 and/or coordinate the assigned high-level task.

In some aspects, supervisor 406 may coordinate the high-level task and further assign one or more subtasks (e.g., subtask one, subtask two, etc.) to different agents. For example, in 422*b*, supervisor 406 may assign subtask one to agent A 408. In 422*c*, supervisor 406 may assign subtask two to agent B.

In 442, in some aspects, different agents, for example, agent A 408 and agent B 410, may share data, coordinate between each other, and share immediate results. In 432, agent B 410 and agent C 412 may share data, coordinate between each other, and share immediate results. In 452, agent C 412 and agent D 414 may also share data, coordinate between each other, and share immediate results.

In 422*d*, in some aspects, after operation, agent A 408 may return result A back to supervisor 406. In 422*e*, agent B 410 may also return result B back to supervisor 406.

In 422*f*, in some aspects, supervisor 406 may combine results from different agents, for example, agent A 408 and agent B 410. Only agent A 408 and agent B 410 are illustrated in FIG. 4 for simplicity in which further collaboration between supervisor 406 and any other agents or coordination between other agents in this hybrid scenario would be appreciated by a person having ordinary skill in the art.

In 422*g*, supervisor 406 may then deliver the final outputs back to user 402.

Figure 5:
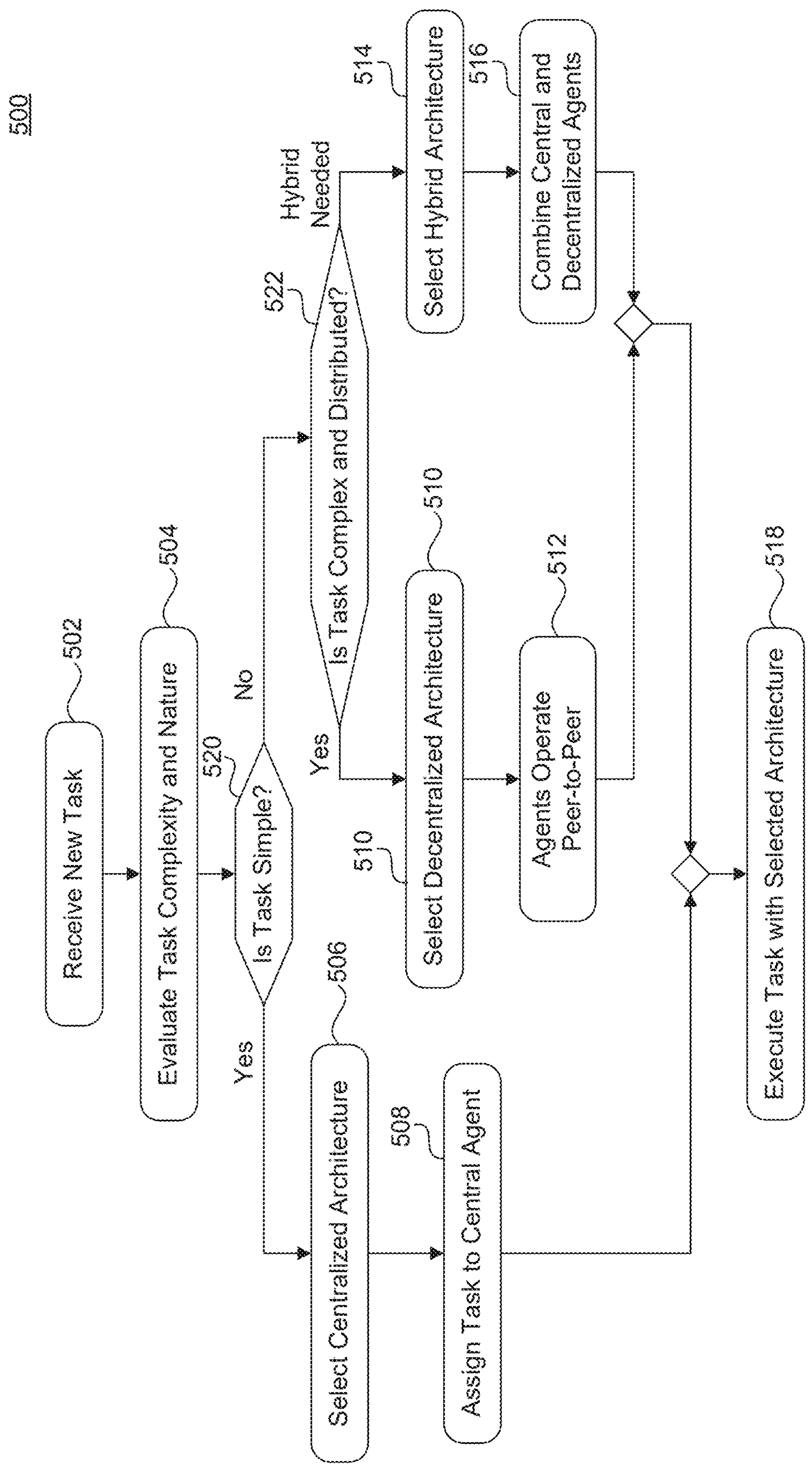
FIG. 5 is a flowchart illustrating decision-making process of multi-agent network and security operations system for selecting the appropriate architecture for a task, according to aspects of the present disclosure.

FIG. 5 is a flowchart 500 illustrating decision-making process of multi-agent network and security operations system 100 for selecting the appropriate architecture for a task, according to aspects of the present disclosure. Flowchart 500 shall be described with reference to at least FIGS. 1-4. However, flowchart 500 is not limited to that those example aspects.

In some aspects, in 502, multi-agent network and security operations system 100 (the system) may receive new task from a user.

In 504, the system may evaluate the task complexity and nature to determine the optimal architecture for the specific task.

In 520, the system may determine the task complexity. In some aspects, this determination may be based on identifying a requirement of a collaboration between a plurality of decentralized agents when executing the task.

In 506, if the task is simple (with low complexity), the system may select centralized architecture for this task. The system may then, in 508, assign the task to a central agent (e.g., a supervisor or a supervising agent).

In 522, on the other hand, if the task is not simple, the system may further determine whether the task is complex and distributed. In some aspect, this determination may be based on identifying a requirement of a central agent for task allocation when executing the task.

In 510, if the task is complex and distributed, the system may select decentralized architecture for this task. The system may then, in 512, enable one or more agents to operate in a peer-to-peer manner.

In 514, otherwise, if the system is not complex and distributed, a hybrid scenario may be needed in which the system may select a hybrid architecture to perform this task. The system may then, in 516, combine central and decentralized agents.

In 518, after determining the optimal architecture for a specific task, the system may execute task with selected architecture.

Figure 6A:
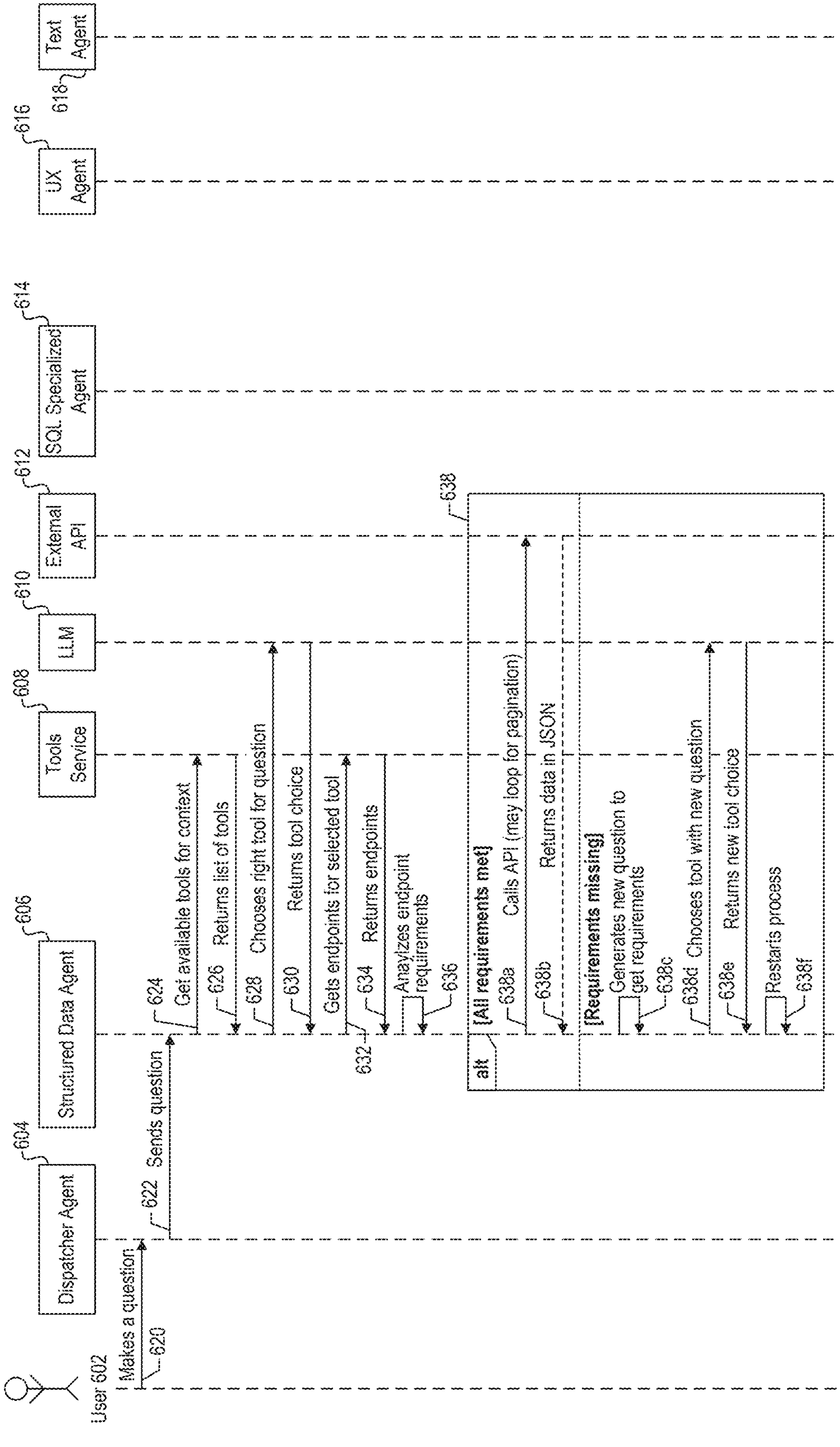
FIG. 6A-6B is an example of natural language query to data visualization illustrating how user questions are converted into API calls and resulting visualizations, according to aspects of the present disclosure.
Figure 6B:
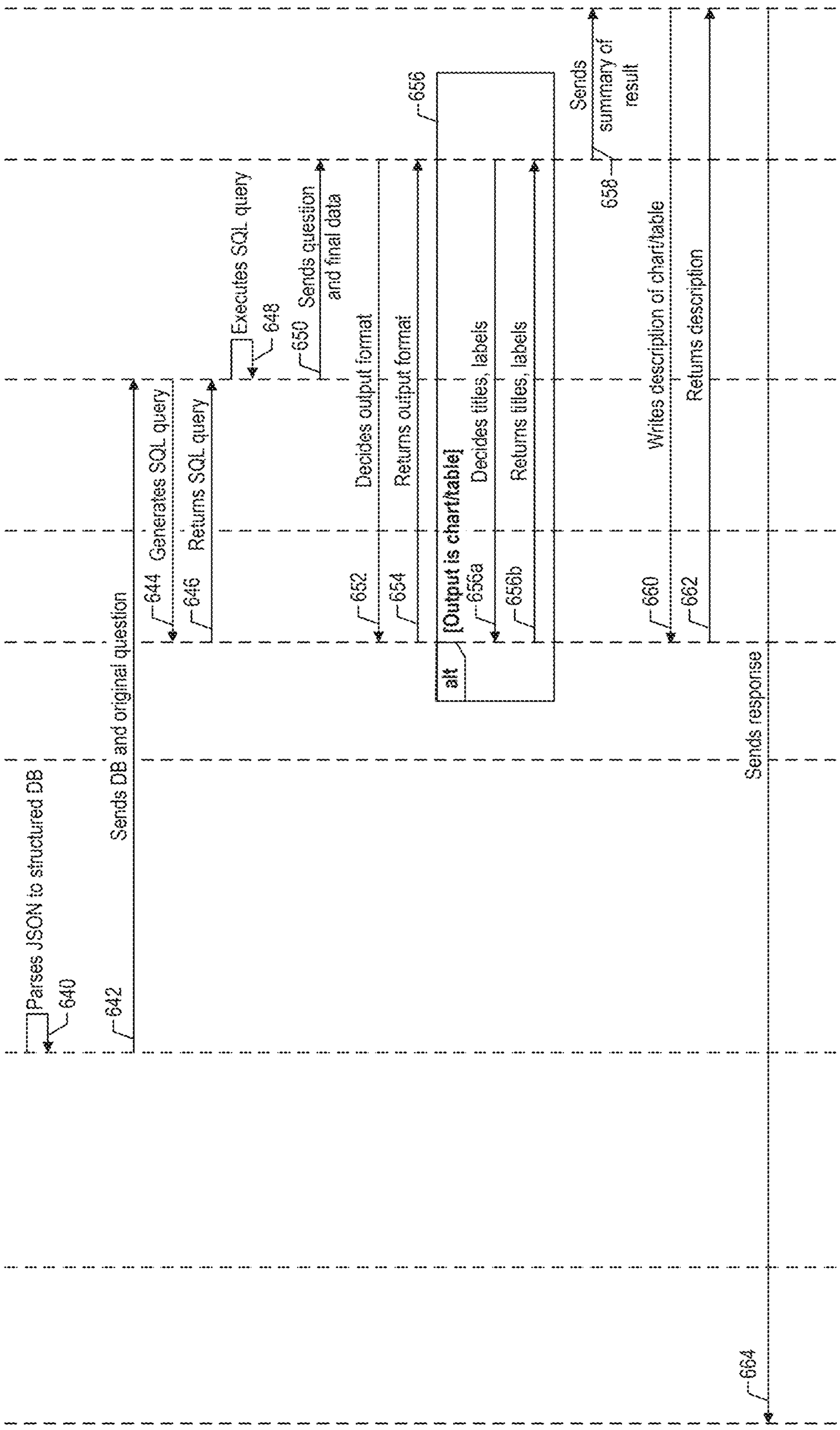

FIG. 6A-6B is an example 600 of natural language query to data visualization illustrating how user questions are converted into API calls and resulting visualizations, according to aspects of the present disclosure. In some aspects, multi-agent network and security operations system 100 (the system) may perform natural language query of input from user 602 to data visualization. The system may include a collaboration between different agents including but not limited to dispatcher agent 604, structured data agent 606, SQL specialized agent 614, user experience (UX) agent 616, and/or text agent 618. The system may also include but is not limited to APIs, databases, and other tools accessible by agents such as tools service 608, LLM 610, and external API 612. For example, tools service 608 may provide agents with access to a broad range of tools, including but not limited to content repositories, SQL, NoSQL and Graph databases APIs, vector stores, search engines, real-time data streams, optimization mechanisms like reinforcement learning or genetic algorithms, causality techniques, and/or pre-defined machine learning models. LLM 610 may provide a LLM gateway-a middleware layer that facilitates the seamless integration of foundational models, including but not limited to, OpenAI GPT, Google Vertex AI, and Meta's LLama2, and/or any fine-tuned models, by acting as a unified interface that manages communication, security, and efficiency between the system and various GenAI services. External API 612, such as Graph databases APIs, may include third-party services that can be embedded in the existing services used by the agents to perform actions or retrieve data.

In 620, when a user 602 makes a question in natural language to multi-agent network and security operations system 100, dispatcher agent 604 associated with the system may receive the question.

In 622, dispatcher agent 604 may forward the question made by user 602 to structured data agent 606.

In 624, structured data agent 606 may query tools service 608 to retrieve available tools in the user context.

In 626, tools service 608 may then return a list of tools back to structured data agent 606. In some aspects, tools service 608 may also help agents determine which tools they can utilize to perform their tasks effectively.

In 628, structured data agents 606 may query LLM 610 to choose right tool for the question given the list of tools identified by the tools service 608. In 630, LLM 610 may then return one or more tools choices back to structured data agent 606.

In 632, structured data agent 606 may request endpoints at tools service 608 associated with the chosen API tool from LLM 610. An endpoint is a digital location exposed via the API from where the API receives requests and sends out responses. In 634, tools service 608 may then return the requested endpoints back to structured data agent 606.

In 636, structured data agent 606 may analyze and check the returned endpoint.

In 638, if all endpoint requirements are met, structured data agent 606, in **638*a*, may call external API 612. In some aspects, structured data agents 606 may need to use pagination along with rate throttling and rate limiting while calling external API 612 to ensure that different APIs can handle the volume of requests being sent and retrieve all the data. In some aspects, structured data agents 606** may identify how many pages are required to answer the user questions and call them in parallel to increase performance of sending and/or retrieving the data.

In **638*b*, external API may return the data back to structured data agent 606 in a JSON format. If any endpoint requirements are not met in 638, structured data agent 606, in 638*c*, may generate a new question to obtain the missing information and/or requirements. In some aspects, structured data agent 606 may recursively generate a new question until all information is gathered. For example, when user asks: "what is the location of my device with IP 172.23.45.65?" the tool chosen initially may be an endpoint GET location/device/{id} as the user may not refer to the id. Structured data agent 606 may generate an extra question: "what is the id of the device with IP 172.23.45.65?", and the system may choose the GET devices with parameter IP=172.23.45.65. Once this has been resolved, structured data agent 606 will come back to the original question resolution. This question asking may happen iteratively until all parameters are resolved. If in the case a required parameter is unreachable by the system, structured data agent 606** may ask directly from the user.

In **638*d*, structured data agents 606 may restart the tool selection via querying LLM 610 and restart endpoint retrieval process via querying tools service 608. In 638*c*, LLM 610 may then return new tool choice back to structured data agent 606. In some aspects, multiple round of generating of new question, restarting tool selection, and/or restarting endpoint retrieval process might be performed by structured data agent 606 until all endpoint requirements are met in 638. In additional, if any endpoint requirements are still not met, structured data agent 606 may contact user 602** for any clarifications and information.

In 640, structured data agent 606 may parse the received data in JSON format from calling external API 612 to convert it into a structured database format.

In 642, structured data agent 606 may then send the structured database and the original question asked by user 602 to a SQL specialized agent 614.

In 644, SQL specialized agent 614 may query LLM 610 to provide exact answer to the question. In 646, in some aspects, LLM 610 may return a generated SQL query that may include the answer to the question to SQL specialized agent 614.

In 648, SQL specialized agent 614 may execute the SQL query from LLM 610 to obtain the final data.

In 650, SQL specialized agent 614 may send the final data obtained from LLM 610 and original question from user 602 to a UX agent 616.

In 652, UX agent 616 may, after receiving the data and question, query LLM 610 to decide the appropriate output format (e.g., text, table, chart, etc.). In 654, LLM 610 may return the output data format to UX agent 616.

In 656, in some aspects, if a chart or table is chosen as output format, UX agent 616, in **656*a*, may work with the LLM 610 to decide on its titles and labels. In 656*b*, LLM 610 may then return the titles and labels back to UX agent 616**.

In 658, UX agent 616 may send a summary of results to text agent 618. In 660, text agent 618 may, after receiving the summary of results, query the LLM 610 to generate a descriptive explanation of the chart or table.

In 662, LLM 610 may then return the description back to text agent 618, and agent 618, in 664, may send the final response (e.g., the returned description from LLM 610) back to user 602.

Figure 7A:
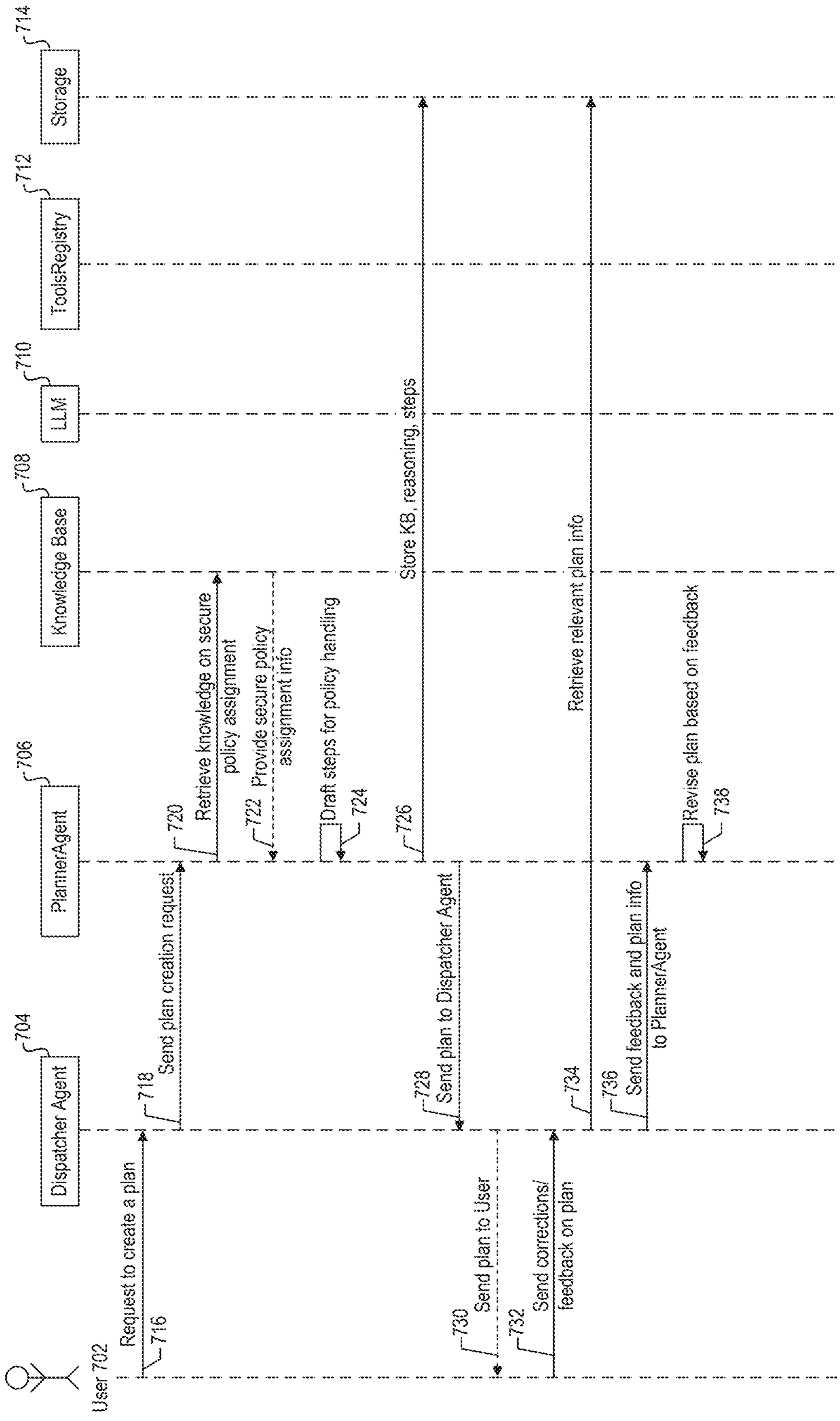
FIG. 7A-7B is an example of natural language to workflow conversion and optimization illustrating conversion of a natural language request into an optimized workflow using an interactive dialogue and evaluating available toolsets for autonomous execution, according to aspects of the present disclosure.
Figure 7B:
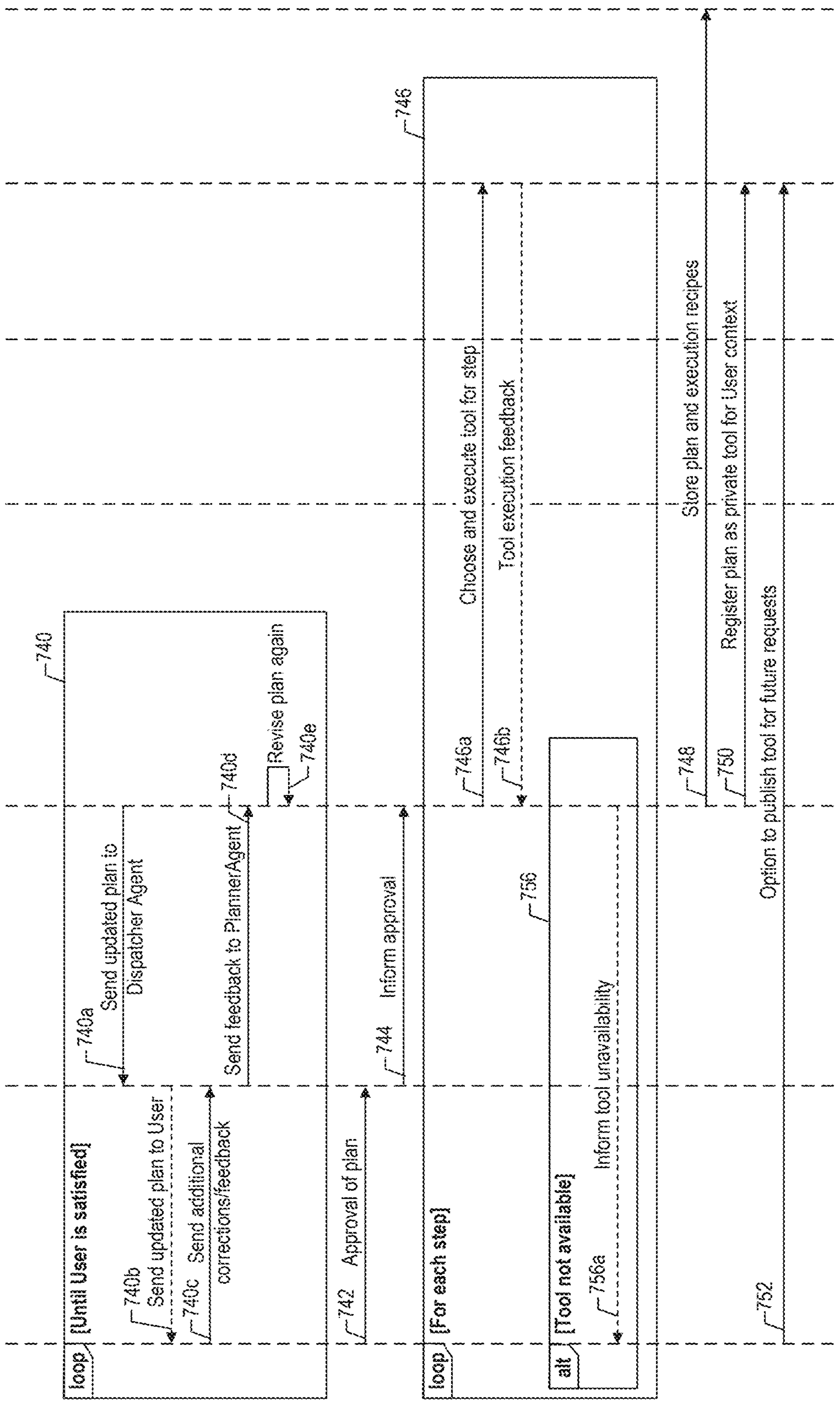

FIG. 7A-7B is an example 700 of natural language to workflow conversion and optimization illustrating conversion of a natural language request into an optimized workflow using an interactive dialogue and evaluating available toolsets for autonomous execution, according to aspects of the present disclosure. In some aspects, multi-agent network and security operations system 100 (the system), which performs natural language to workflow conversion and optimization, may include a collaboration between user 702, dispatcher agent 704, and planner agent 706. The system may also include but is not limited to knowledge base 708, LLM 710, tools registry 712 and storage 714.

In 716, when user 702 makes a request to create a plan to achieve a particular outcome (e.g., automatically handle security policy requests) to multi-agent network and security operations system 100, dispatcher agent 704 associated with the system may receive the plan creation request. In 718, the system may forward the plan creation request to planner agent 706.

In 720, planner agent 706 may retrieve relevant information from knowledge base 708 to understand any security policy assignments. In 722, knowledge base 708 may then provide these security policy assignment information back to planner agent 706. In some aspects, LLM 710 may be queried by planner agent 706 to perform this retrieval of the relevant information from knowledge base 708.

In 724, planner agent 706 may draft one or more steps based on the information received from knowledge base 708. For example, these one or more steps may include but not limited to verifying the user's identity, the app's management, the user's role, and/or the potential risk of assigning the policy.

In some aspects, after drafting the one or more steps in 724, planner agent 706 may transmit the one or more steps to a stepwise agent. The stepwise agent may verify and/or optimize the one or more steps (e.g., associated with the plan), and/or then provide any verification or optimization results back to planner agent 706.

In 726, planner agent 706 may store the information retrieved from knowledge base 708, reasoning, and/or the one or more drafted steps into a storage 714.

In 728, planner agent 706 may also send the proposed plan back to dispatcher agent 704. In 730, dispatcher agent 704 may then forward the proposed plan back to user 702.

In 732, user 702 may provide and send feedback or corrections of the proposed plan, in a synchronous or asynchronous way, back to dispatcher agent 704.

In 734, dispatcher agent 704 may further retrieve the previous proposed plan's information from storage 714, and then may, in 736, send the retrieved previous proposed plan's information from storage 714 along with the feedback or corrections from user 702, back to planner agent 706.

In 738, planner agent 706 may revise the plan based on the feedback or corrections. In some aspects, until user 702 approves or may be satisfied with the revised plan, the collaboration, in 740, may continue among planner agent 706, dispatcher agent 704, and user 702.

In 740*a*, planner agent 706 may send updated plan back to dispatcher agent 704. In 740*b*, dispatcher agent 704 may send the updated plan back to user 702.

In 740*c*, user 702 may send additional corrections or feedback back to dispatcher agent 704. In 740*d*, dispatcher agent 704 may send feedback or corrections back to planner agent 706. In 740*e*, the updated plan may additionally be revised by planner agent 706.

In 742, the revised plan may be approved by user 702 and received by dispatcher agent 704. In 744, the approval may then be informed by dispatcher agent 704 and received by planner agent 706.

For each step of the plan in 746, planner agent 706, in 746*a*, may select one or more appropriate tools from tools registry 712. In some aspects, planner agent 706 may query LLM 710 to choose right tool for each step of the plan, given the list of tools registered in tools registry 712. LLM 710 may then return one or more tools choices back to planner agent 706.

In 746*b*, tools registry 712 may prepare and send execution recipes (e.g., tool execution feedback) back to planner agent 706.

In 756, if a tool is not available within tools registry 712, planner agent 706, in 756*a*, may then inform user 702 if a tool is unavailable within tools registry 712.

In 748, planner agent 706 may store the revised plan and the execution recipes in storage 714. In 750, planner agent 706 may also register the plan as a private tool for the user's context in tools registry 712.

In 752, user 702 may have an option to publish the tool (e.g., the private tool), making the tool available for any future natural language requests.

Figure 8:
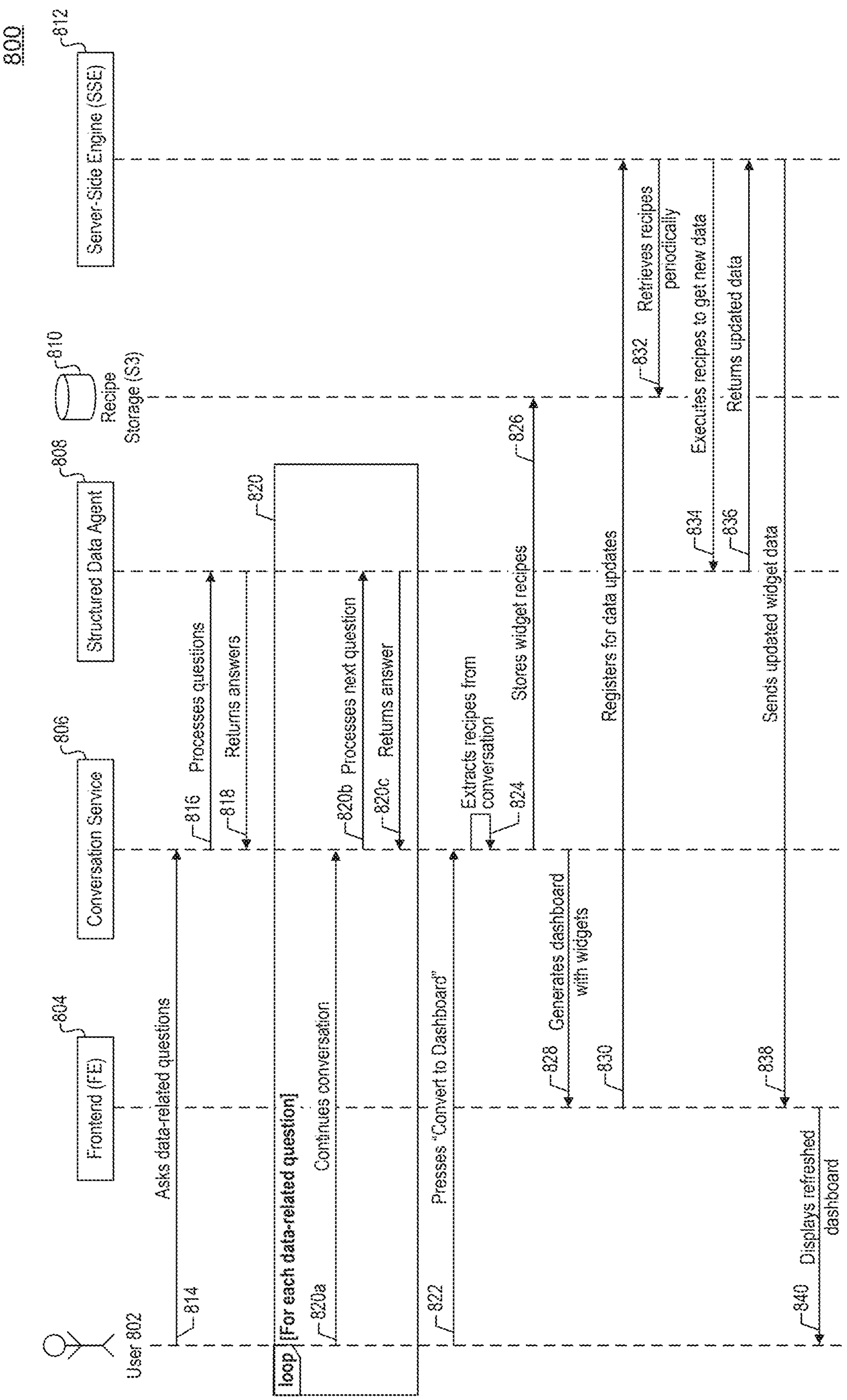
FIG. 8 illustrates an example illustrating converting of user conversation to dashboard, according to aspects of the present disclosure.

FIG. 8 is an example 800 illustrating converting of user conversation to dashboard, according to aspects of the present disclosure. In some aspects, multi-agent network and security operations system 100 (the system), which performs converting of user conversation to a dashboard, may include a collaboration between user 802, frontend 804, conversation service 806, structured data agent 808, and server-side engine 812. The system may also include recipe storage 810.

In 814, when user 802 asks data-related questions to multi-agent network and security operations system 100 (the system), a conversation service 806 associated with the system may receive the questions.

In 816, conversation service 806 may process the questions via structured data agent 808, and in 818, structured data agent 808 may return answers to the question back to conversation service 806.

In 820, for each data related question, in 820*a*, user 802 may engage in a continuous conversation with conversation service 806. In 820*b*, conversation service 806 may process each question in the conversion via structured data agent 808. In 820*c*, structured data agent 808 may return answer to each of the question back to conversation service 806.

In 822, when user 802 decides to convert this conversation into a dashboard, user 802 may press "Convert to Dashboard" and the system may send a command to conversation service 806.

In 824, conversation service 806 may extract recipes (e.g., methods to retrieve and display data) from the conversation between user 802 and conversation service 806. In 826, the extracted recipes may be stored in recipe storage 810.

In 828, after extracting recipes from conversion, conversation service 806 may generate a dashboard on frontend 804 to display widgets for the extracted recipes.

In 830, frontend 804 may register for data updates via server-side engine 812. In some aspects, server-side engine 812 may refer to a component that validates data and requests, stores and/or retrieves data from databases.

In 832, server-side engine 812 may periodically trigger data updates by retrieving recipes from recipe storage 810.

In 834, server-side engine 812 may execute the retrieved recipes to get new data via structured data agent 808. In 836, structured data agent 808 may then return updated data back to server-side engine 812.

In 838, server-side engine 812 may also send the updated data (e.g., widget data) back to frontend 804.

In 840, after receiving the widget data, frontend 804 may display the updated or refreshed data on the dashboard widgets to user 802 for real-time monitoring purposes.

Figure 9:
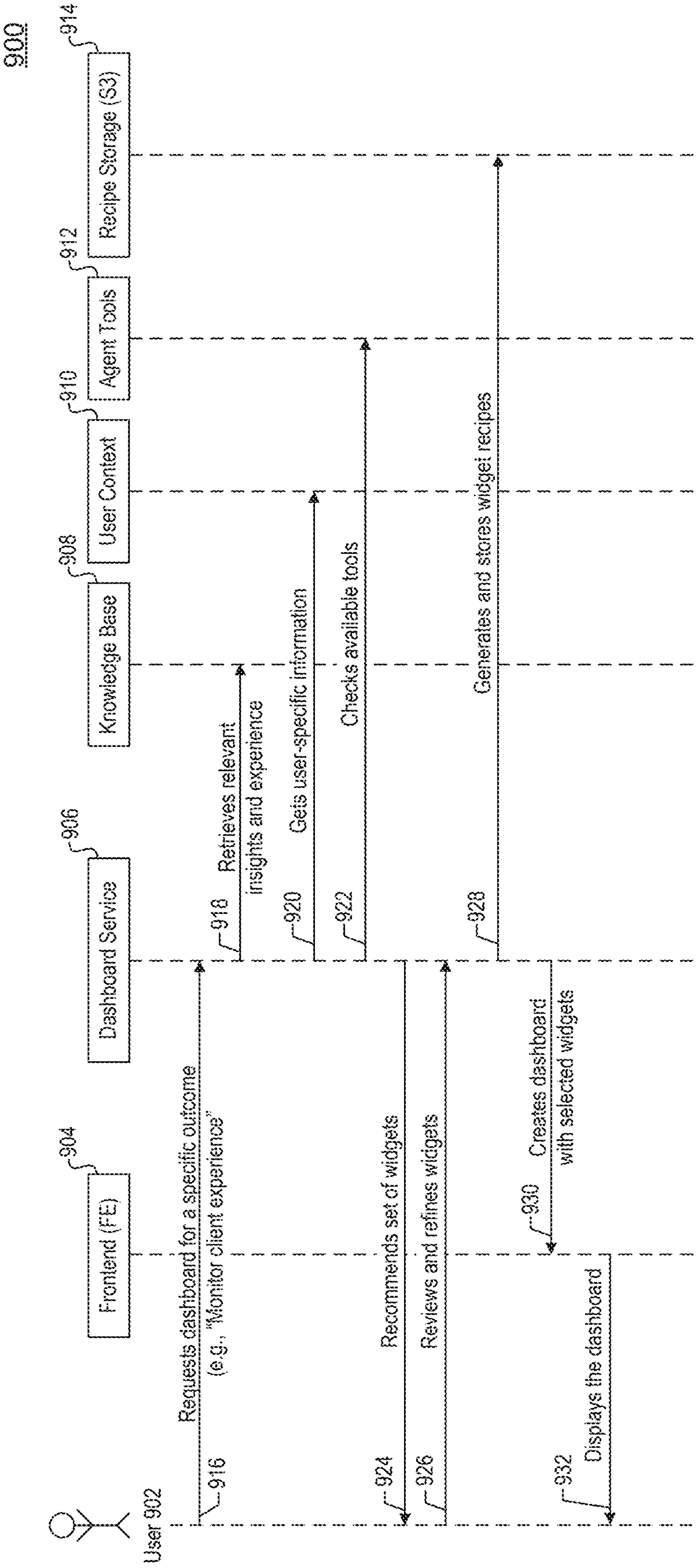
FIG. 9 is an example illustrating an outcome based dashboard creation, according to aspects of the present disclosure.

FIG. 9 is an example 900 illustrating an outcome based dashboard creation, according to aspects of the present disclosure. In some aspects, multi-agent network and security operations system 100 (the system) that performs dashboard creation may include a collaboration between user 902, frontend 904, and dashboard service 906. The system may also include knowledge base 908, user context 910, agent tools 912, and recipe storage 914.

In 916, when a user 902 requests dashboard for a specific outcome (e.g., monitor client experience) to multi-agent network and security operations system 100 (the system), dashboard service 906 associated with the system may receive the request.

In 918, dashboard service 906 may retrieve relevant insights and experience to find relevant widgets and insights from knowledge base 908. In 920, dashboard service 906 may get user-specific information (e.g., preferences, past interactions) from user context 910. In 922, dashboard service 906 may also check available tools from agent tools 912.

In 924, after retrieving all relevant information and available tools, dashboard service 906 may recommend a set of widgets to user 902.

In 926, user 902 may then review the recommended widgets from dashboard service 906 and may refine the selection through further conversation (e.g., requesting the dashboard for further specific outcomes) with dashboard service 906.

In 928, dashboard service 906 may extract recipes (e.g., methods to retrieve and display data) for the selected or recommended widgets in which the extracted recipes may be stored in recipe storage 914.

In 930, after extracting recipes for the widgets, dashboard service 906 may generate a dashboard on frontend 904 to display widgets for the extracted recipes.

In 932, frontend 904 may then display the updated data on the dashboard widgets to user 902 for any real-time monitoring purposes.

Figure 10:
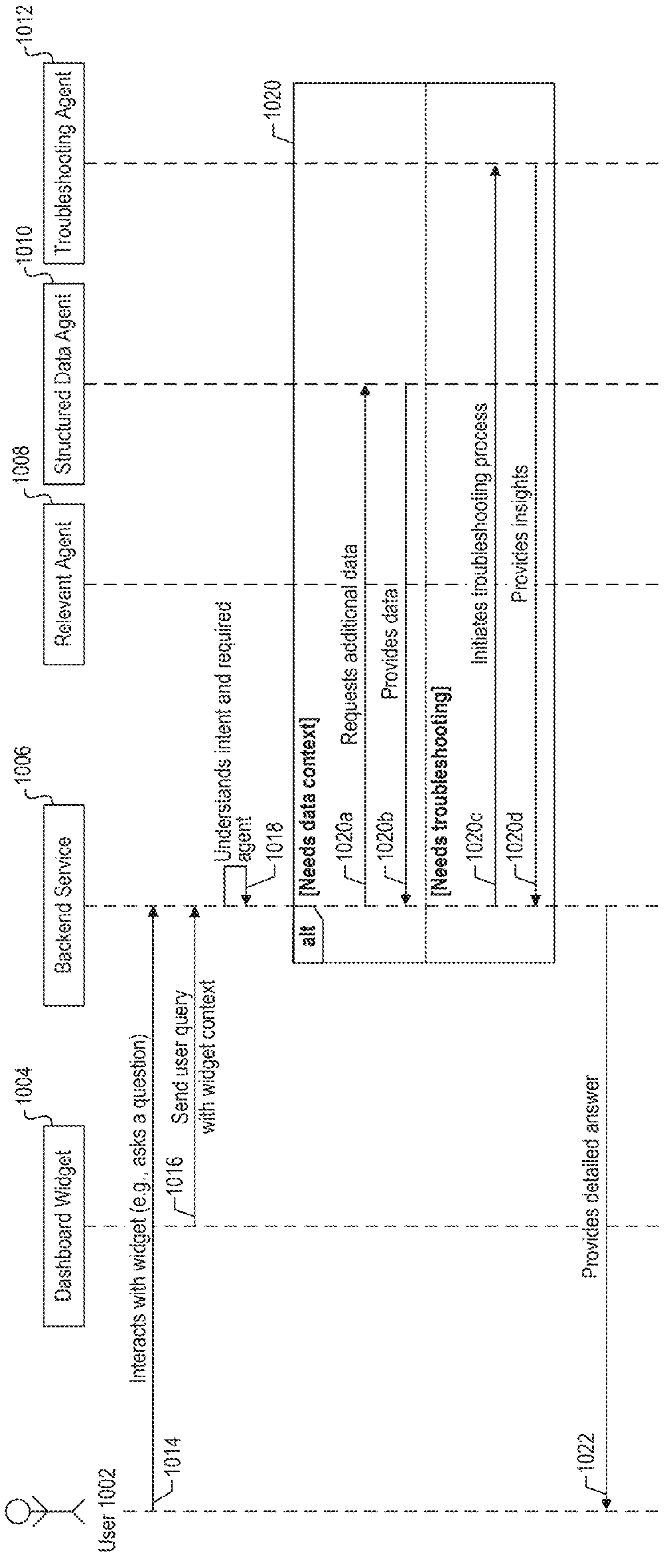
FIG. 10 is an example illustrating an interactive widget engagement, according to aspects of the present disclosure.

FIG. 10 is an example 1000 illustrating an interactive widget engagement, according to aspects of the present disclosure. In some aspects, multi-agent network and security operations system 100 that performs interactive widget engagement may include a collaboration between user 1002, dashboard widget 1004, backend service 1006, relevant agent 1008, structured data agent 1010, and troubleshooting agent 1012.

In 1014, a user 1002 may interact directly with dashboard widget 1004 by asking questions to gain deeper insights.

In 1016, dashboard widget 1004 may send user query along with its data context to backend service 1006. In some aspects, the data context may also include a screenshot of the widget image at the time of the user asks a question, so AI can "see" what the user is referring too. For example, if user asks: "why there is an oscillation in the Tx error rate?" the AI may benefit not only from the data contexts but also by seeing the oscillations as the human sees them.

In 1018, backend service 1006 may then determine the user intent and decide which relevant agent 1008 can best provide the information.

In some aspects, in 1020, when more data contexts are needed, in 1020*a*, backend service 1006 may request additional data from structured data agent 1010. In 1020*b*, structured data agent 1010 may provide such additional data to backend service 1006 as requested.

In some aspects, in 1020, when troubleshooting is needed, in 1020*c*, backend service 1006 may initiate troubleshooting process with troubleshooting agent 1012 and/or other agents for root cause analysis. In 1020*d*, troubleshooting agent 1012 and/or other agents may provide insights on troubleshooting back to backend service 1006. For example, on the question: "I see traffic is growing, can you tell me then we will reach full capacity?" the system may pose the question to a prediction performance agent.

In 1022, after receiving requested additional data and provided troubleshooting insights, backend service 1006 may compile the information and provide a detailed answer back to user 1002.

Figure 11:
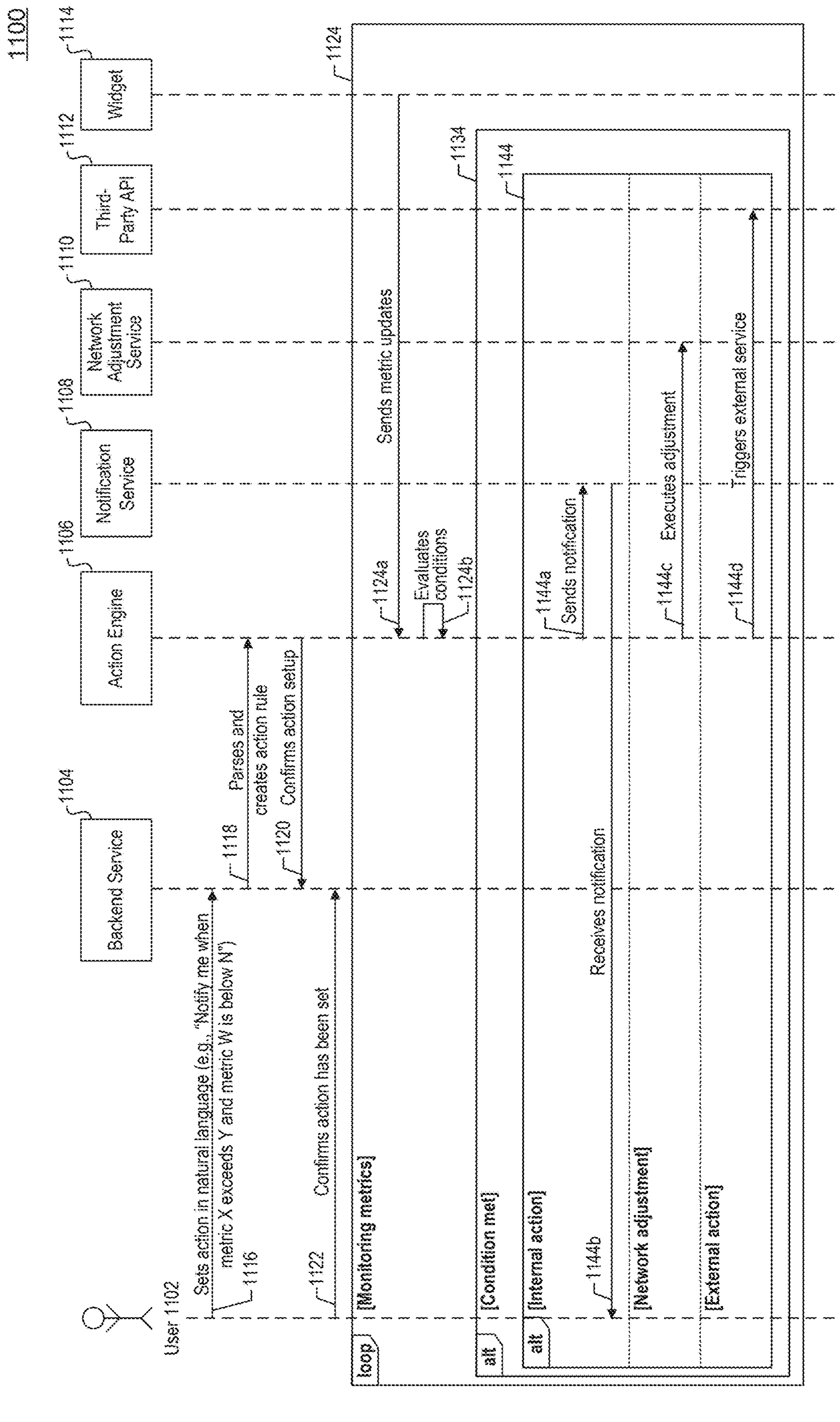
FIG. 11 is an example illustrating an actionable dashboards, according to aspects of the present disclosure.

FIG. 11 is an example 1100 illustrating an actionable dashboards, according to aspects of the present disclosure. In some aspects, multi-agent network and security operations system 100 that performs actionable dashboards may include collaboration between user 1102, backend service 1104, action engine 1106, and widget 1114. The system may also include, but is not limited to, a notification service 1108, a network adjustment service 1110, and a third-party API 1112.

In 1116, a user 1102 may instruct backend service 1104 to set up an action using natural language. The action may include, for example, "notify me when metric X exceeds Y and metric W is blew N."

In 1118, backend service 1104 may parse the instruction or action from user 1102 and/or create an action rule within action engine 1106.

In 1120, action engine 1106 may confirm the action setup with backend service 1104 which may verify that parameters and details of an action are correctly configured.

In 1122, backend service 1104 may notify user 1102 when the actions have been successfully set up.

In 1124, in some aspects, action engine 1106, in 1124*a*, may continuously monitor the relevant metrics via widget 1114 in which widget 1114 may keep sending metric updates back to action engine 1106. In 1124*b*, action engine 1106 may evaluate conditions after receiving metric updates from widget 1114.

In 1134, in some aspects, when conditions are met, in 1144*a*, action engine 1106 may, via internal actions in 1144, send notification to notification service 1108. In 1144*b*, notification service 1108 may then notify user 1102. In 1144*c*, action engine 1106 may, via tools registered in the tool registry and available to the agent based on the notification context, execute changes or adjustments to network configurations from network adjustment service 1110. In 1144*d*, action engine 1106 may, via external actions, trigger external service from third-party API 1112. In some aspects, such trigged external service may include, but is not limited to, turning off lights if no users are connected. The external actions may have also been added to the tools registry by the user, i.e. may be private tools registered by the user and available to the agent.

Figure 12:
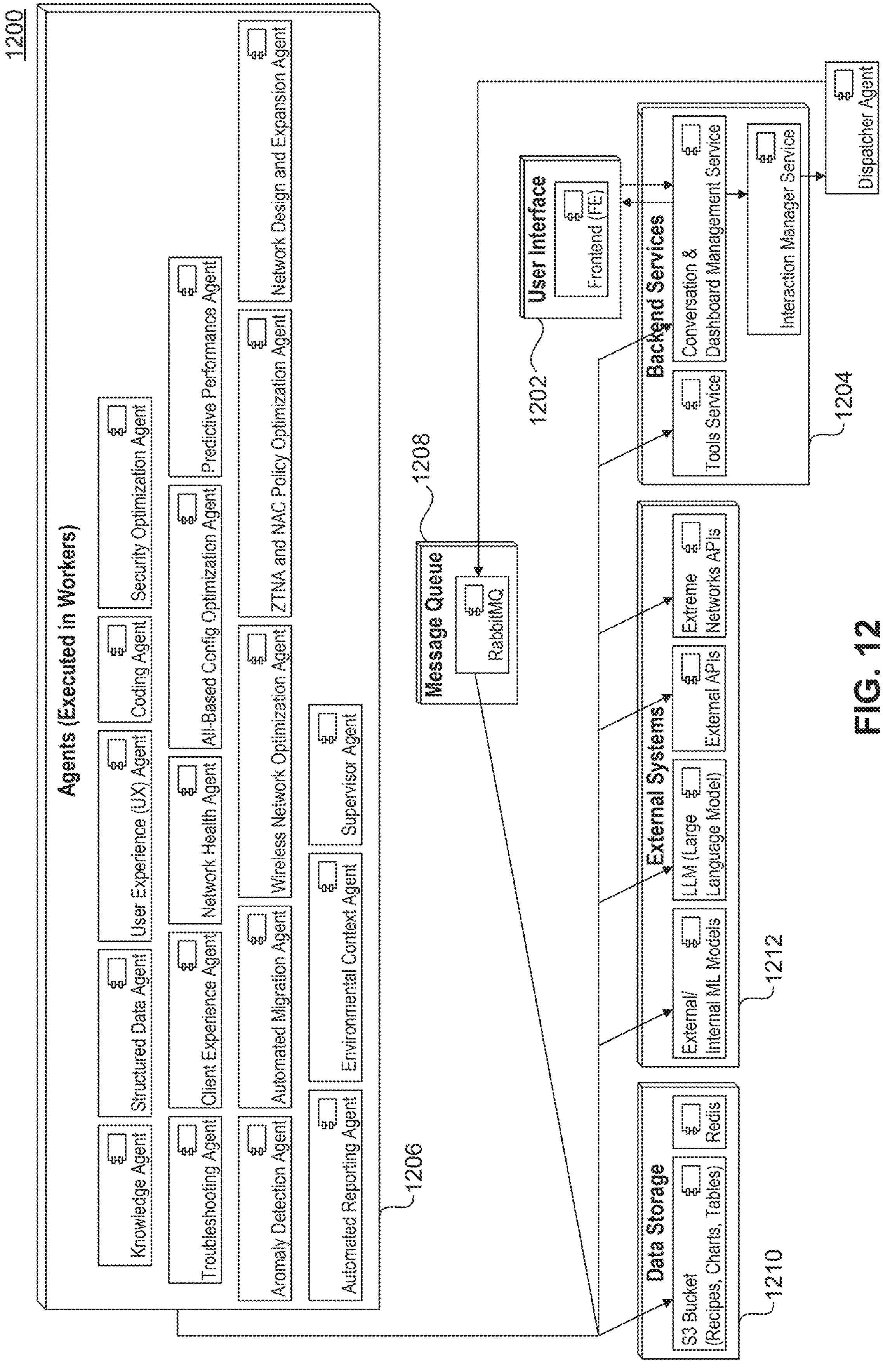
FIG. 12 is an example illustrating a data flow of multi-agent network and security operations system, according to aspects of the present disclosure.

FIG. 12 is an example 1200 illustrating a data flow of multi-agent network and security operations system 100, according to aspects of the present disclosure. In some aspects, the data flow may include but is not limited to actions and/or collaboration from user interface 1202, backend service 1204, agents (e.g., executed in workers) 1206, message queue 1208, data storage 1210, and external systems 1212.

In some aspects, user interface 1202 may include a frontend. The frontend may perform interactions between the user and multi-agent network and security operations system 100, including conversations and dashboard displays.

In some aspects, user interface 1202 may include an AI canvas. The user may use this AI canvas to draw different plan steps (e.g., in directed acyclic graph) while the user interacts with the conversational assistant about the plan. The user can also modify it either in the conversation or directly in the directed acyclic graph using this AI canvas.

In some aspects, backend service 1204 may include, but is not limited to, conversation and dashboard management service, interaction manager service, and tools service. For example, conversation and dashboard management service may store user questions, answers, feedback, and conversation structures. Interaction manager service may contain a dispatcher agent and manage the routing of interactions to the appropriate agents via RabbitMQ. Tools service may provide agents with the tools available in the current user context. Tools service may also help agents determine which tools they can utilize to perform their tasks effectively.

In some aspects, agents (executed in workers) 1206 may include specialized agents including but not limited to knowledge agent, structured data agent, user experience agent, coding agent, security optimization agent, troubleshooting agent, client experience agent, network health agent, AI-based configuration optimization agent, predictive performance agent, anomaly detection agent, automated migration agent, wireless network optimization agent, zero trust network access (ZTNA) and network access control (NAC) policy optimization agent, network design and expansion agent, automated reporting agent, environmental context agent, and/or supervisor agent. Specialized agents may perform various tasks and execute within celery workers in the modeling service by using technologies including RabbitMQ or Celery. In some aspects, these agents except the dispatcher agent may be executed within Celery workers in the Modeling Service. The dispatcher agent may instead reside within the interaction manager service and may be responsible for task routing (e.g., using a queue message broker). Agents may perform specialized tasks and may interact with various external systems to fulfill their responsibilities. In addition, the supervisor agent may orchestrate complex or composed processes that require coordination among multiple agents (e.g. and distributed workers). The supervisor agent may ensure that tasks are executed in the correct sequence and aggregates results before sending the final answer to the user.

In some aspects, message queue 1208 may include RabbitMQ, an open-source message-broker software that originally implemented the advanced message queuing protocol and may support other protocols including streaming text oriented messaging protocol, and message queuing (MQ) telemetry transport protocol. Message queue 1208 may facilitate communication between the interaction manager service and the agents by managing different queues. RabbitMQ may facilitate asynchronous communication between the interaction manager service and agents.

In some aspects, data storage 1210 may include, but is not limited to, Redis and S3 Bucket. Redis may provide temporary storage for responses produced by agents. Redis may also be used as an in-memory data store for fast retrieval and publishing of agent responses. S3 Bucket may store recipes, charts, and table responses.

In some aspects, external systems 1212 may include, but is not limited to, extreme networks APIs & external APIs, LLM services, and/or external machine learning models. For example, extreme networks APIs & external APIs may be used by agents to perform actions (e.g., network-related actions) or retrieve network data. In some aspects, extreme networks APIs & external APIs may also be used by agents to access applications or user behavior data. External APIs may be used for actions defined in the dashboard, such as third-party service integrations. In some aspects, user might bring their own actions through connecting their own APIs. LLM services may be communicated with by agents for language processing tasks. External machine learning models may be used for inference as needed by the agents.

In an example of data flow, in some aspects, frontend of user interface 1202 may communicate with the conversation and dashboard services at backend services 1204. This communication may interact with the interaction manager service at backend services 1204. In some aspects, The Interaction Manager Service may use RabbitMQ to dispatch tasks to appropriate agents 1206. Agents 1206 may then perform their tasks and interact with external systems 1212. Responses from external systems 1212 may be sent to Redis at data storage 1210, and the conversation and dashboard management service at backend services 1204 may subscribe to any updates. The final responses may be pushed back to the frontend of user interface 1202 for user display.

Figure 13:
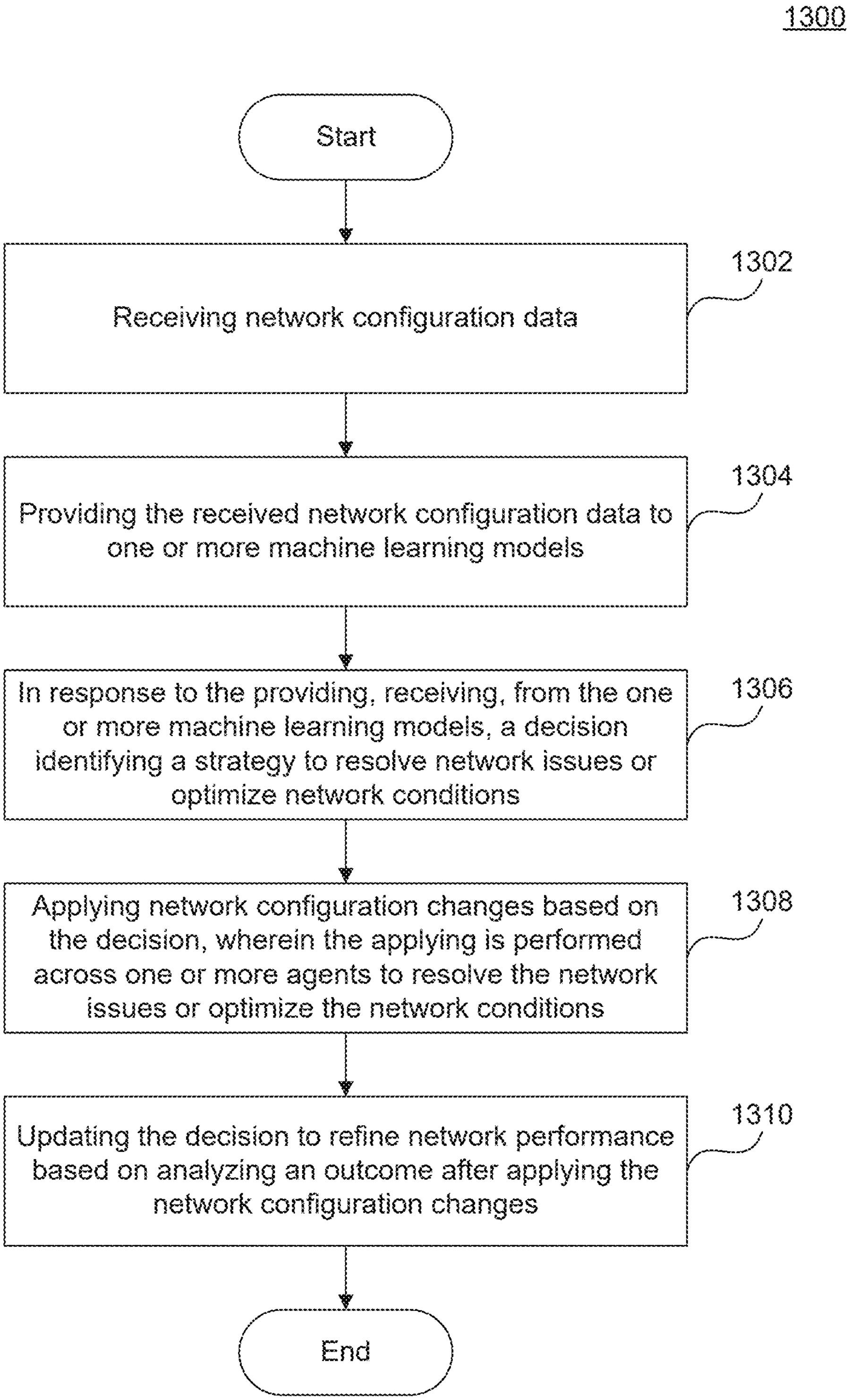
FIG. 13 is a flowchart illustrating a method for comprehensive network management, according to aspects of the present disclosure.

FIG. 13 is a flowchart illustrating a method 1300 for comprehensive network management, according to aspects of the present disclosure. Method 1300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 13, as will be understood by a person of ordinary skill in the art. Method 1300 shall be described with reference to at least FIGS. 1 and 12. However, method 1300 is not limited to those example aspects.

In 1302, network configuration data may be received by multi-agent network and security operations system 100 (the system). In some aspects, the network configuration data may include, but is not limited to, data from network devices, logs, environment, and/or user interactions. In some aspects, prior to receiving the network configuration data at 1302, a user query asking to improve network configurations may be received by the system.

In 1304, multi-agent network and security operations system 100 may provide the received network configuration data from 1302 to one or more machine learning models. In some aspects, the one or more machine learning models may be trained by the system on historical network configuration data to make an informed decision that optimizes network performance.

In 1306, in response to the providing in 1304, multi-agent network and security operations system 100 may receive, from the one or more machine learning models, a decision identifying a strategy to resolve network issues or optimize network conditions.

In 1308, multi-agent network and security operations system 100 may apply network configuration changes to the network based on the decision from 1306. In some aspects, the applying may be performed across one or more agents of the system to resolve the network issues or optimize the network conditions. In some aspects, the one or more agents may include but are not limited to a supervising agent and a plurality of specialized agents. In some aspects, the supervising agent and one or more specialized agents may collaboratively manage network operations and handle network management functions.

In 1310, multi-agent network and security operations system 100 may update the decision from 1306 to refine network performance based on analyzing an outcome after applying the network configuration changes from 1308.

Figure 14:
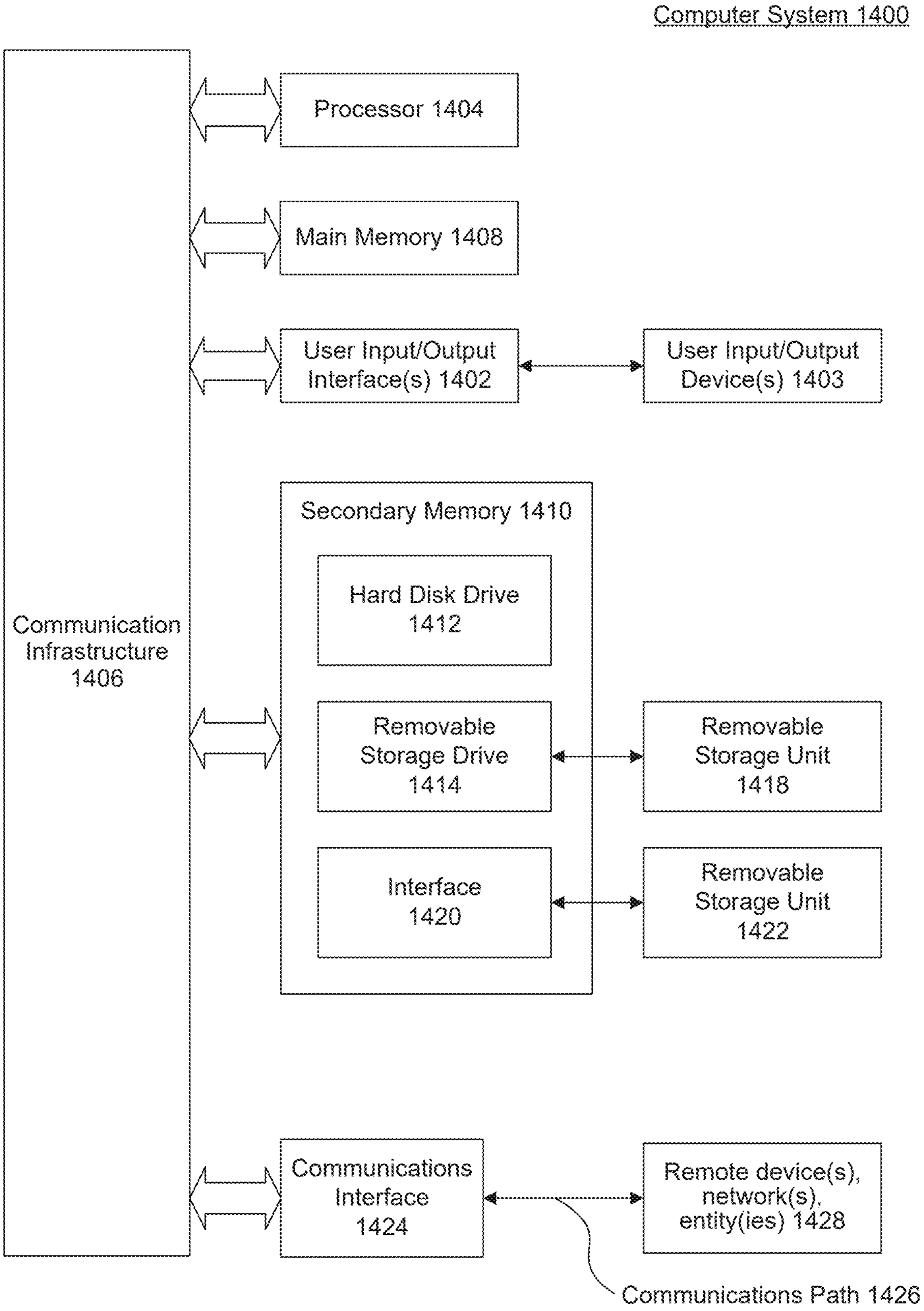
FIG. 14 illustrates an example computer system useful for implementing various aspects of the present disclosure.

Various aspects may be implemented, for example, using one or more well-known computer systems, such as computer system 1400 shown in FIG. 14. For example, aspects herein using the text summarization system may be implemented using combinations or sub-combinations of computer system 1400. Also or alternatively, one or more computer systems 1400 may be used, for example, to implement any of the aspects discussed herein, as well as combinations and sub-combinations thereof. A "module," as the term is used herein, is a computational element that performs one or more functions according to computer readable instructions stored on one or more memories or other non-transitory computer-readable media.

Computer system 1400 may include one or more processors (also called central processing units, or CPUs), such as a processor 1404. Processor 1404 may be connected to a communication infrastructure or bus 1406.

Computer system 1400 may also include user input/output device(s) 1403, such as monitors, keyboards, pointing devices, etc., which may communicate with communication infrastructure 1406 through user input/output interface(s) 1402.

One or more of processors 1404 may be a graphics processing unit (GPU). In an aspect, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1400 may also include a main or primary memory 1408, such as random access memory (RAM). Main memory 1408 may include one or more levels of cache. Main memory 1408 may have stored therein control logic (i.e., computer software) and/or data.

Computer system 1400 may also include one or more secondary storage devices or memory 1410. Secondary memory 1410 may include, for example, a hard disk drive 1412 and/or a removable storage device or drive 1414. Removable storage drive 1414 may be a floppy disk drive, a magnetic tape drive, a compact disk drive, an optical storage device, tape backup device, and/or any other storage device/drive.

Removable storage drive 1414 may interact with a removable storage unit 1418. Removable storage unit 1418 may include a computer usable or readable storage device having stored thereon computer software (control logic) and/or data. Removable storage unit 1418 may be a floppy disk, magnetic tape, compact disk, DVD, optical storage disk, and/any other computer data storage device. Removable storage drive 1414 may read from and/or write to removable storage unit 1418.

Secondary memory 1410 may include other means, devices, components, instrumentalities or other approaches for allowing computer programs and/or other instructions and/or data to be accessed by computer system 1400. Such means, devices, components, instrumentalities or other approaches may include, for example, a removable storage unit 1422 and an interface 1420. Examples of the removable storage unit 1422 and the interface 1420 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1400 may further include a communication or network interface 1424. Communication interface 1424 may enable computer system 1400 to communicate and interact with any combination of external devices, external networks, external entities, etc. (individually and collectively referenced by reference number 1428). For example, communication interface 1424 may allow computer system 1400 to communicate with external or remote devices 1428 over communications path 1426, which may be wired and/or wireless (or a combination thereof), and which may include any combination of LANs, WANs, the Internet, etc. Control logic and/or data may be transmitted to and from computer system 1400 via communication path 1426.

Computer system 1400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1400, main memory 1408, secondary memory 1410, and removable storage units 1418 and 1422, as well as tangible articles of manufacture embodying any combination of the foregoing. Such control logic, when executed by one or more data processing devices (such as computer system 1400 or processor(s) 1404), may cause such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 14. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A computer-implemented method for generating a workflow plan for completing a process, comprising:

receiving, by a planner agent using at least one processor, a user request from a user device, wherein the user request comprises a natural language description of the workflow plan;

retrieving, from a knowledge database by the planner agent in response to the receiving, workflow information associated with a step of the workflow plan;

generating, by the planner agent, a plurality of steps associated with the workflow plan;

retrieving, from a storage database by a dispatcher agent, plan information, wherein the plan information comprises a sample workflow plan generated from a sample user request and the workflow information, wherein the workflow information is further associated with a step of the sample workflow plan;

generating, by the planner agent using a large language model (LLM) and a prompt, the workflow plan, wherein the prompt is associated with the user request, the plurality of steps associated with the workflow plan, and the plan information; and updating, by the planner agent using the LLM, the workflow plan based on user feedback and a historical workflow plan associated with the workflow plan, wherein the updating comprises modifying at least one step of the plurality of steps in the workflow plan based on an analysis of the historical workflow plan, execution outcomes associated with the historical workflow plan, and the user feedback associated with the execution outcomes to refine the workflow plan.

2. The computer-implemented method of claim 1, further comprising:

storing, into the storage database by the planner agent, the workflow information, the plurality of steps associated with the workflow plan, and the plan information.

3. The computer-implemented method of claim 1, further comprising:

transmitting, by the planner agent to the user device, a request for providing one or more user feedbacks for the updated workflow plan; and generating, by the planner agent, the updated workflow plan, wherein the generating comprises combining the one or more user feedbacks into the workflow plan, thereby generating the updated workflow plan.

4. The computer-implemented method of claim 1, further comprising:

selecting, from a tool registry service by the planner agent using the LLM and a second prompt, a tool associated with the step of the workflow plan, wherein the second prompt is associated with the workflow plan and one or more available tools in the tool registry service;

executing, at the tool registry service by the planner agent, the step of the workflow plan using the tool selected by the LLM;

obtaining, from the tool registry service, a tool execution recipe associated with executing the step of the workflow plan; and storing, into the storage database by the planner agent, the workflow plan and the tool execution recipe.

5. The computer-implemented method of claim 1, further comprising:

registering, at a tool registry service by the planner agent, the workflow plan as a tool associated with the user device, wherein the tool is available for a new user request for generating a new workflow plan.

6. The computer-implemented method of claim 1, wherein the workflow information associated with the step of the workflow facilitates troubleshooting a loss of connectivity, assigning a security policy, or generating a forensic report on an incident.

7. The computer-implemented method of claim 4, wherein the executing the step of the workflow plan comprises verifying at least one of an identity of the user device, a management of the user device, a role of the user device, or potential risk of assigning a security policy to the step of the workflow plan.

8. A system for generating a workflow plan for completing a process, comprising:

one or more memories;

at least one processor each coupled to at least one of the memories and configured to perform operations comprising:

receiving, by a planner agent, a user request from a user device, wherein the user request comprises a natural language description of the workflow plan;

retrieving, from a knowledge database by the planner agent in response to the receiving, workflow information associated with a step of the workflow plan;

generating, by the planner agent, a plurality of steps associated with the workflow plan;

retrieving, from a storage database by a dispatcher agent, plan information, wherein the plan information comprises a sample workflow plan generated from a sample user request and the workflow information, wherein the workflow information is further associated with a step of the sample workflow plan;

generating, by the planner agent using a large language model (LLM) and a prompt, the workflow plan, wherein the prompt is associated with the user request, the plurality of steps associated with the workflow plan, and the plan information; and updating, by the planner agent using the LLM, the workflow plan based on user feedback and a historical workflow plan associated with the workflow plan, wherein the updating comprises modifying at least one step of the plurality of steps in the workflow plan based on an analysis of the historical workflow plan, execution outcomes associated with the historical workflow plan, and the user feedback associated with the execution outcomes to refine the workflow plan.

9. The system of claim 8, wherein the operations further comprise:

storing, into the storage database by the planner agent, the workflow information, the plurality of steps associated with the workflow plan, and the plan information.

10. The system of claim 8, wherein the operations further comprise:

transmitting, by the planner agent to the user device, a request for providing one or more user feedbacks for the updated workflow plan; and generating, by the planner agent, the updated workflow plan, wherein the generating comprises combining the one or more user feedbacks into the workflow plan, thereby generating the updated workflow plan.

11. The system of claim 8, wherein the operations further comprise:

selecting, from a tool registry service by the planner agent using the LLM and a second prompt, a tool associated with the step of the workflow plan, wherein the second prompt is associated with the workflow plan and one or more available tools in the tool registry service;

executing, at the tool registry service by the planner agent, the step of the workflow plan using the tool selected by the LLM;

obtaining, from the tool registry service, a tool execution recipe associated with executing the step of the workflow plan; and storing, into the storage database by the planner agent, the workflow plan and the tool execution recipe.

12. The system of claim 8, wherein the operations further comprise:

registering, at a tool registry service by the planner agent, the workflow plan as a tool associated with the user device, wherein the tool is available for a new user request for generating a new workflow plan.

13. The system of claim 11, wherein the workflow information associated with the step of the workflow facilitates troubleshooting a loss of connectivity, assigning a security policy, or generating a forensic report on an incident.

14. The system of claim 11, wherein the executing the step of the workflow plan comprises verifying at least one of an identity of the user device, a management of the user device, a role of the user device, or potential risk of assigning a security policy to the step of the workflow plan.

15. A non-transitory computer-readable medium having instructions stored thereon that, when executed by at least one processor, cause the at least one processor to perform operations comprising:

receiving, by a planner agent, a user request from a user device, wherein the user request comprises a natural language description of the workflow plan;

retrieving, from a knowledge database by the planner agent in response to the receiving, workflow information associated with a step of the workflow plan;

generating, by the planner agent, a plurality of steps associated with the workflow plan;

retrieving, from a storage database by a dispatcher agent, plan information, wherein the plan information comprises a sample workflow plan generated from a sample user request and the workflow information, wherein the workflow information is further associated with a step of the sample workflow plan;

generating, by the planner agent using a large language model (LLM) and a prompt, the workflow plan, wherein the prompt is associated with the user request, the plurality of steps associated with the workflow plan, and the plan information; and updating, by the planner agent using the LLM, the workflow plan based on user feedback and a historical workflow plan associated with the workflow plan, wherein the updating comprises modifying at least one step of the plurality of steps in the workflow plan based on an analysis of the historical workflow plan, execution outcomes associated with the historical workflow plan, and the user feedback associated with the execution outcomes to refine the workflow plan.

16. The non-transitory computer-readable medium of claim 15, wherein the operations further comprise:

storing, into the storage database by the planner agent, the workflow information, the plurality of steps associated with the workflow plan, and the plan information.

17. The non-transitory computer-readable medium of claim 15, wherein the operations further comprise:

transmitting, by the planner agent to the user device, a request for providing one or more user feedbacks for the updated workflow plan; and generating, by the planner agent, the updated workflow plan, wherein the generating comprises combining the one or more user feedbacks into the workflow plan, thereby generating the updated workflow plan.

18. The non-transitory computer-readable medium of claim 15, wherein the operations further comprise:

selecting, from a tool registry service by the planner agent using the LLM and a second prompt, a tool associated with the step of the workflow plan, wherein the second prompt is associated with the workflow plan and one or more available tools in the tool registry service;

executing, at the tool registry service by the planner agent, the step of the workflow plan using the tool selected by the LLM;

obtaining, from the tool registry service, a tool execution recipe associated with executing the step of the workflow plan; and storing, into the storage database by the planner agent, the workflow plan and the tool execution recipe.

19. The non-transitory computer-readable medium of claim 15, wherein the operations further comprise:

registering, at a tool registry service by the planner agent, the workflow plan as a tool associated with the user device, wherein the tool is available for a new user request for generating a new workflow plan.

20. The non-transitory computer-readable medium of claim 15, wherein the workflow information associated with the step of the workflow facilitates troubleshooting a loss of connectivity, assigning a security policy, or generating a forensic report on an incident.

* * * * *